US012512769B2

(12) United States Patent
Toyoda

(10) Patent No.: US 12,512,769 B2
(45) Date of Patent: Dec. 30, 2025

(54) POWER CONVERSION DEVICE

(71) Applicant: Mitsubishi Electric Corporation, Tokyo (JP)

(72) Inventor: Hajime Toyoda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 251 days.

(21) Appl. No.: 18/574,070

(22) PCT Filed: Jul. 14, 2021

(86) PCT No.: PCT/JP2021/026433
§ 371 (c)(1),
(2) Date: Dec. 26, 2023

(87) PCT Pub. No.: WO2023/286197
PCT Pub. Date: Jan. 19, 2023

(65) Prior Publication Data
US 2024/0243671 A1 Jul. 18, 2024

(51) Int. Cl.

| | |
|---|---|
| ***H02M 1/14*** | (2006.01) |
| ***H02M 5/458*** | (2006.01) |
| ***H02M 7/5395*** | (2006.01) |
| *H02M 7/493* | (2007.01) |

(52) U.S. Cl.
CPC ......... *H02M 7/5395* (2013.01); *H02M 1/143* (2013.01); *H02M 5/4585* (2013.01); *H02M 7/493* (2013.01)

(58) Field of Classification Search
CPC ... H02M 1/14–15; H02M 5/458–4585; H02M 7/5395; H02M 7/493
See application file for complete search history.

(56) References Cited

FOREIGN PATENT DOCUMENTS

| | | | | |
|---|---|---|---|---|
| JP | 2006174608 A * | 6/2006 | ............. | H02M 7/48 |
| JP | 2006288035 A * | 10/2006 | ............. | H02M 7/48 |
| JP | 4457124 B2 * | 4/2010 | .......... | H02M 5/4585 |
| JP | 5574182 B2 | 8/2014 | | |

OTHER PUBLICATIONS

Office Action issued Mar. 13, 2025 in Korean Patent Application No. 10-2024-7000045, 9 pages.
International Search Report and Written Opinion mailed on Oct. 5, 2021, received for PCT Application PCT/JP2021/026433, filed on Jul. 14, 2021, 10 pages including English Translation.

* cited by examiner

*Primary Examiner* — Thienvu V Tran
*Assistant Examiner* — Jennifer C Caulk
(74) *Attorney, Agent, or Firm* — XSENSUS LLP

(57) ABSTRACT

A power conversion device includes a converter, an inverter and a control circuit that controls them. The control circuit generates: first control signals that control the converter, on the basis of a first carrier wave; and second control signals that control the inverter, on the basis of a second carrier wave having a frequency and a phase that are different from those of the first carrier wave. The frequency of the first carrier wave and the frequency of the second carrier wave have a predetermined relationship therebetween based on a current of a capacitor connected in between the converter and the inverter.

20 Claims, 21 Drawing Sheets f1: fsw0 − 3fin
f2: fsw0 + 3fin
f3: 2fsw0
f4: 3fsw0 − 6fin
f5: 3fsw0 + 6fin
f6: 4fsw0 f1: fsw0 − 3fin
f2: fsw0 + 3fin
f3: 2fsw0
f4: 3fsw0 − 6fin
f5: 3fsw0 + 6fin
f6: 4fsw0

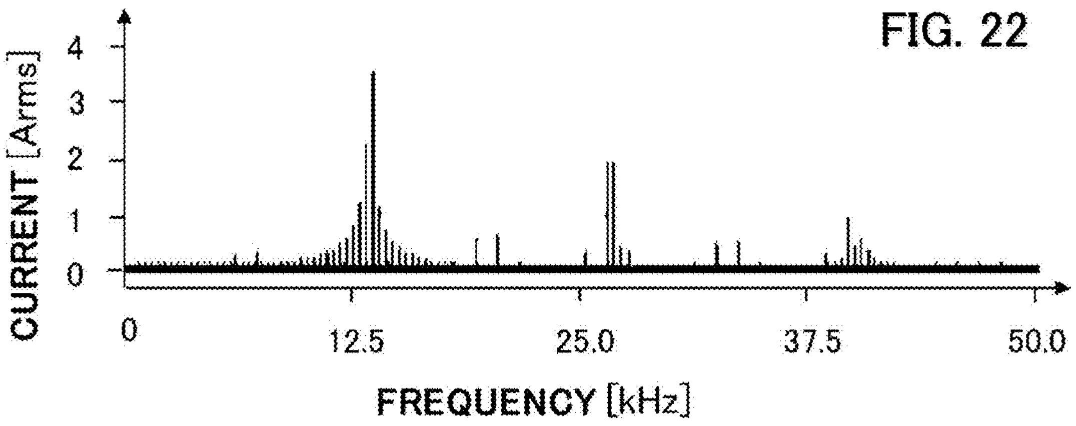
FIG. 22
FIG. 23
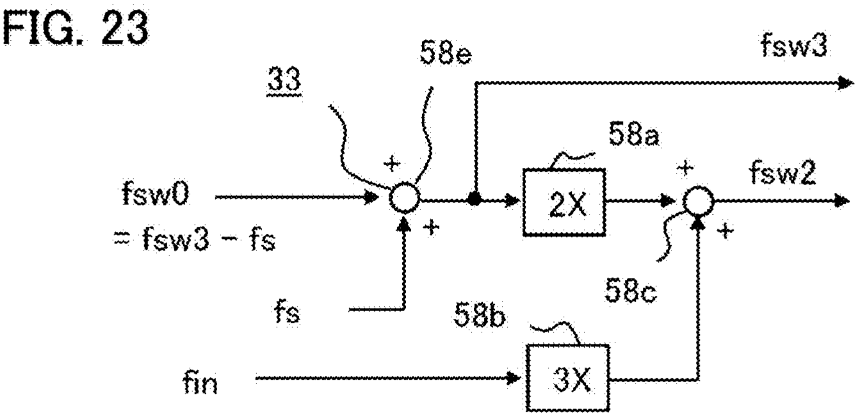

FIG. 37
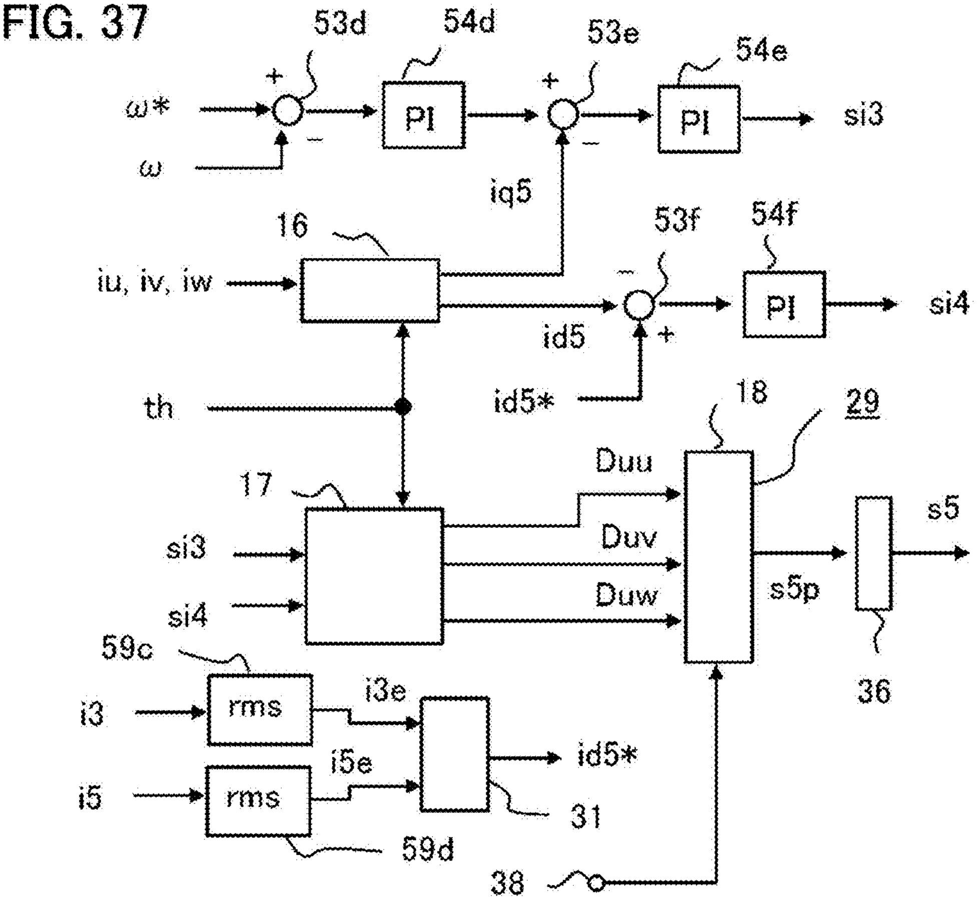
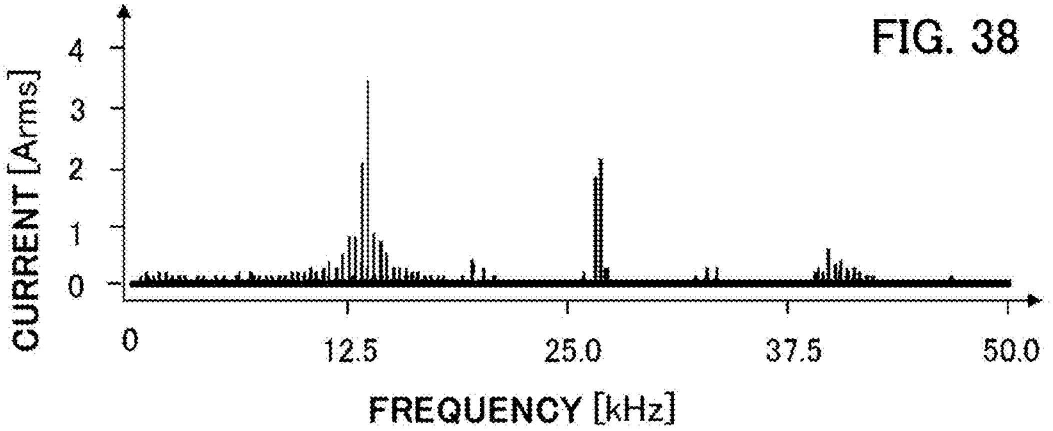
FIG. 38

POWER CONVERSION DEVICE

CROSS-REFERENCE TO RELATED APPLICATION

This application is a national stage application, filed under 35 U.S.C. § 371, of International Patent Application No. PCT/JP2021/026433, filed Jul. 14, 2021, the entire contents of which are incorporated herein by reference.

TECHNICAL FIELD

The present application relates to a power conversion device.

BACKGROUND ART

In Patent Document 1, a power conversion system is disclosed which includes: a converter for converting three-phase AC power to DC power; an inverter for converting the DC power to three-phase AC power; a smoothing capacitor connected in between the converter and the inverter; and a generation means of carriers with different phases. The power conversion system of Patent Document 1 is operated while providing, by use of the generation means of carriers with different phases, a prescribed phase difference A between a carrier (carrier wave) for performing PWM (Pulse Width Modulation) control of the converter that is one of converting units and a carrier for performing PWM control of the inverter that is the other one of the converting units, so that a current flowing across the smoothing capacitor is reduced and thus the capacitance of the smoothing capacitor is allowed to be reduced.

CITATION LIST

Patent Document

Patent Document 1: Japanese Patent Application Laid-open No. 2006-288035 (FIG. 1 and FIG. 2)

SUMMARY OF INVENTION

Problems to be Solved by Invention

Since the power conversion system of Patent Document 1 is operated using the carrier waves whose frequencies are the same, it has been found that, when the two conversion units are different in modulation method, carrier ripple currents of the two conversion units, namely, the converter and the inverter, that flow into the smoothing capacitor, cannot be reduced sufficiently.

Techniques disclosed in this description are directed to a power conversion device including two conversion units that are different in modulation method, and an object thereof is to efficiently reduce carrier ripple currents that may flow into a capacitor located in between the two conversion units.

Means for Solving Problems

A power conversion device disclosed as an example in this description supplies to a load, second AC power converted from first AC power inputted from an AC power source. The power conversion device comprises: a converter that converts the first AC power inputted from the AC power source to DC power: an inverter that converts the DC power outputted from the converter to the second AC power: a capacitor that is connected between a high-potential side line and a low-potential side line through which the DC power is transferred: and a control circuit that controls the converter and the inverter. The control circuit comprises: a converter control circuit that generates first control signals that control a plurality of switching elements in the converter, on the basis of a first carrier wave: an inverter control circuit that generates second control signals that are different in modulation method from the first control signals and that control a plurality of switching elements in the inverter, on the basis of a second carrier wave having a frequency and a phase that are different from those of the first carrier wave; and a carrier wave generation circuit that generates the first carrier wave and the second carrier wave. The frequency of the first carrier wave and the frequency of the second carrier wave have a predetermined relationship therebetween based on a current flowing into the capacitor or a current flowing out of the capacitor.

Effect of Invention

According to the power conversion device disclosed as an example in this description, since the converter and the inverter are controlled using the first control signals and the second control signals that are different in modulation method, frequency and phase from each other and the respective frequencies of which have the predetermined relationship therebetween, it is possible to efficiently reduce the carrier ripple currents flowing into the capacitor.

BRIEF DESCRIPTION OF DRAWINGS

FIG. 7 is a diagram showing a configuration of a carrier phase calculation circuit in

FIG. 4.

FIG. 22 is a graph showing frequency components in the capacitor current of the power conversion device according to Embodiment 1.

FIG. 23 is a diagram showing another example of a frequency generation circuit in FIG. 9 or FIG. 10.

FIG. 37 is a diagram showing a configuration of an inverter control circuit in FIG. 34.

FIG. 38 is a graph showing frequency components in a capacitor current of the power conversion device according to Embodiment 4.

MODES FOR CARRYING OUT INVENTION

Embodiment 1

Figure 1:
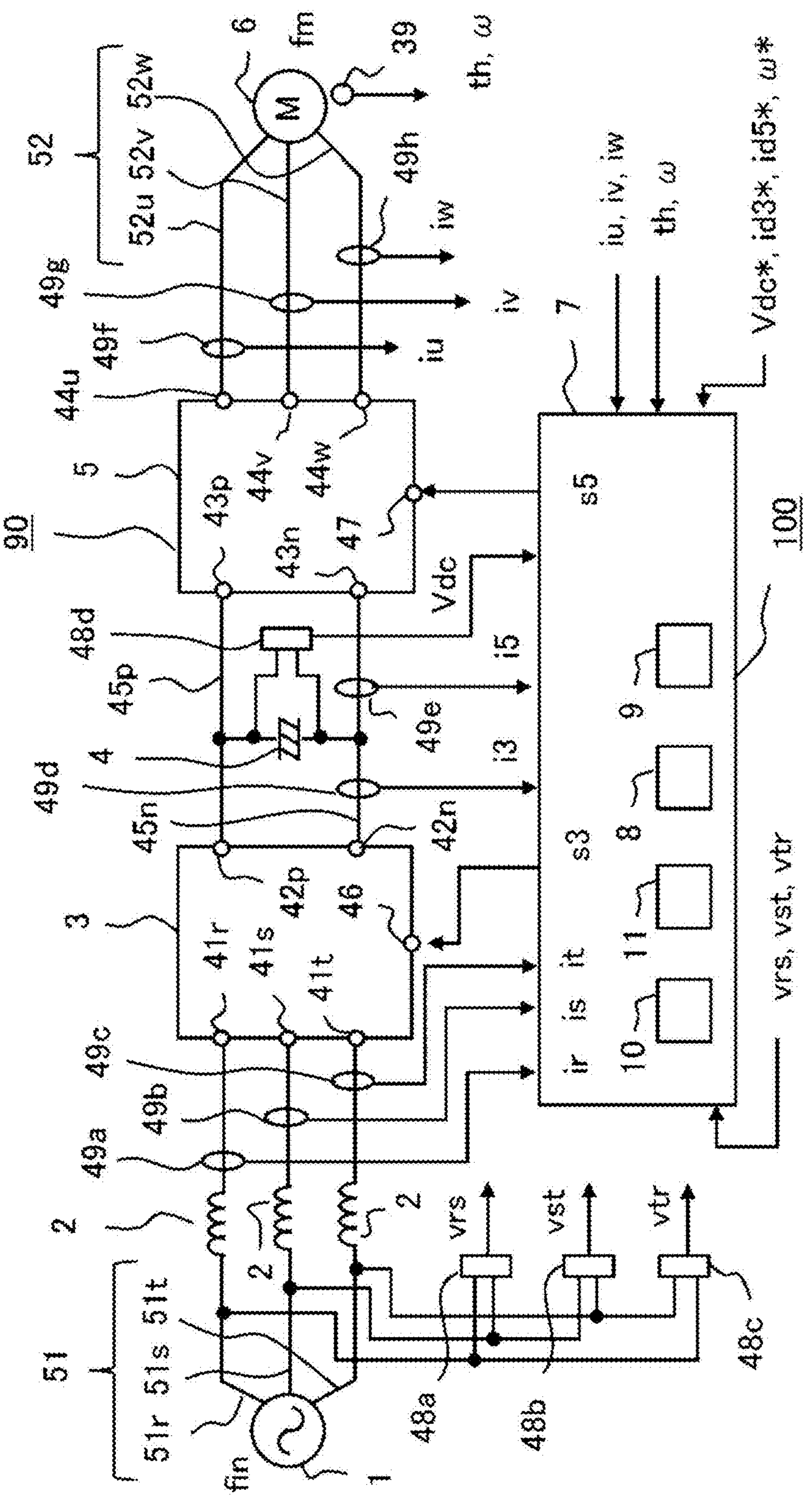
FIG. 1 is a diagram showing a configuration of a power conversion device according to Embodiment 1.
Figure 2:
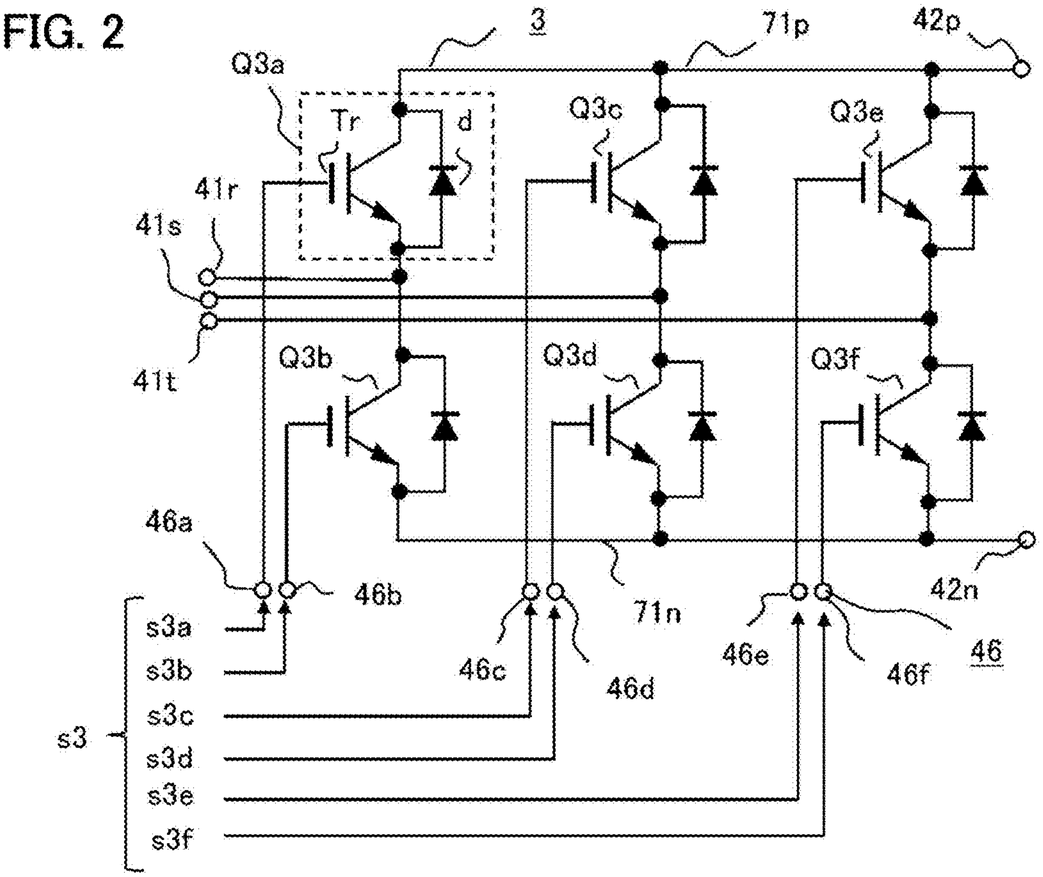
FIG. 2 is a diagram showing a configuration of a converter in FIG. 1.
Figure 3:
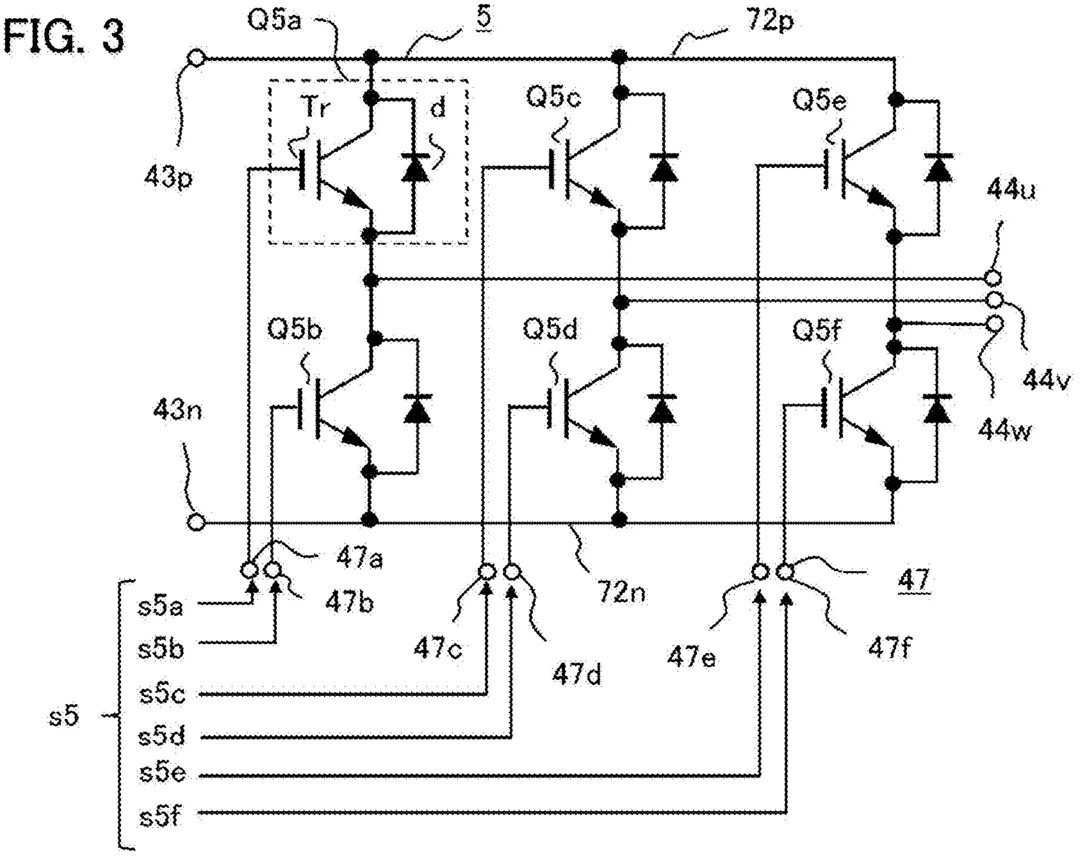
FIG. 3 is a diagram showing a configuration of an inverter in FIG. 1.
Figure 4:
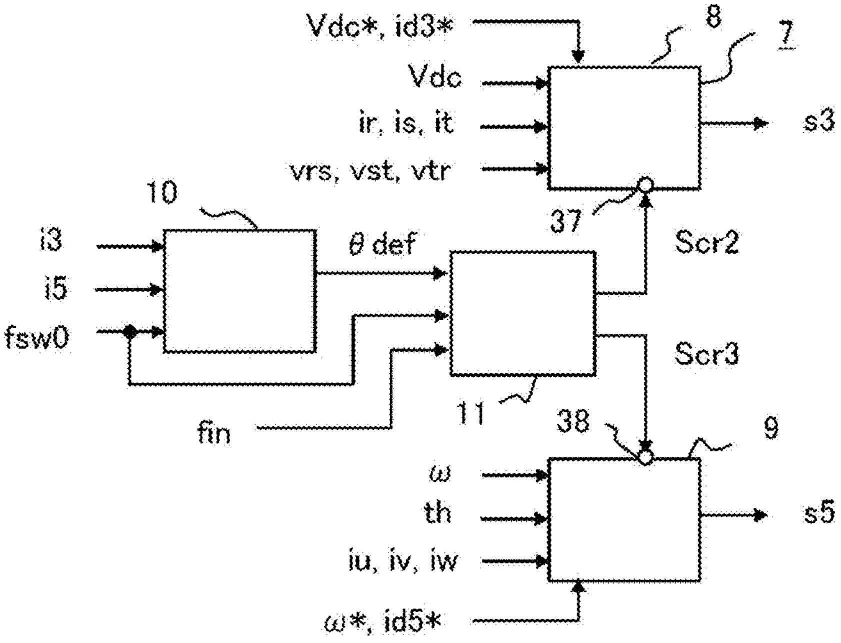
FIG. 4 is a diagram showing a configuration of a control circuit in FIG. 1.
Figure 5:
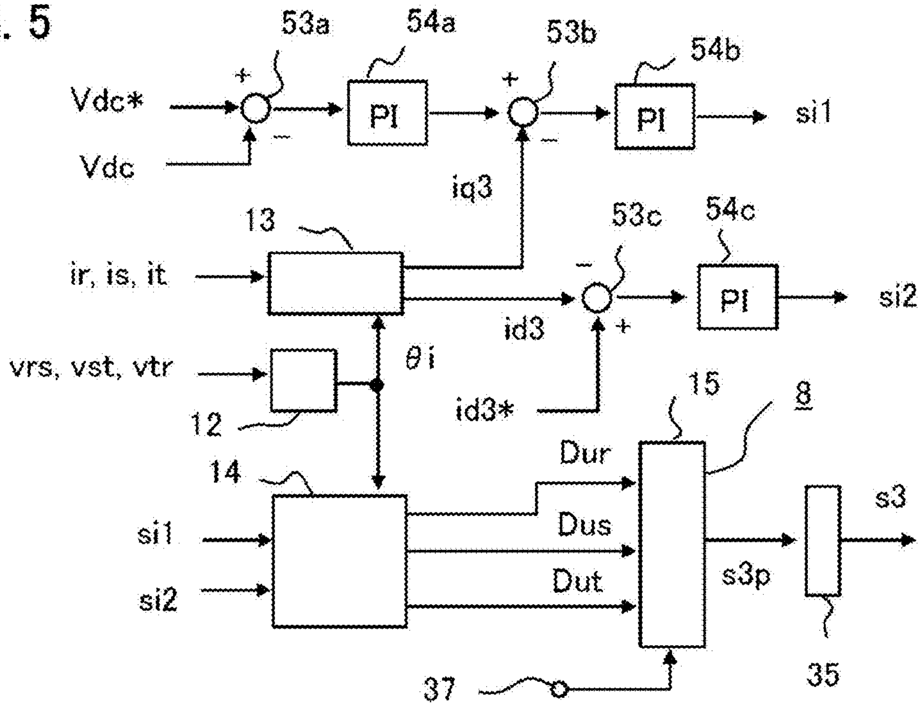
FIG. 5 is a diagram showing a configuration of a converter control circuit in FIG. 4.
Figure 6:
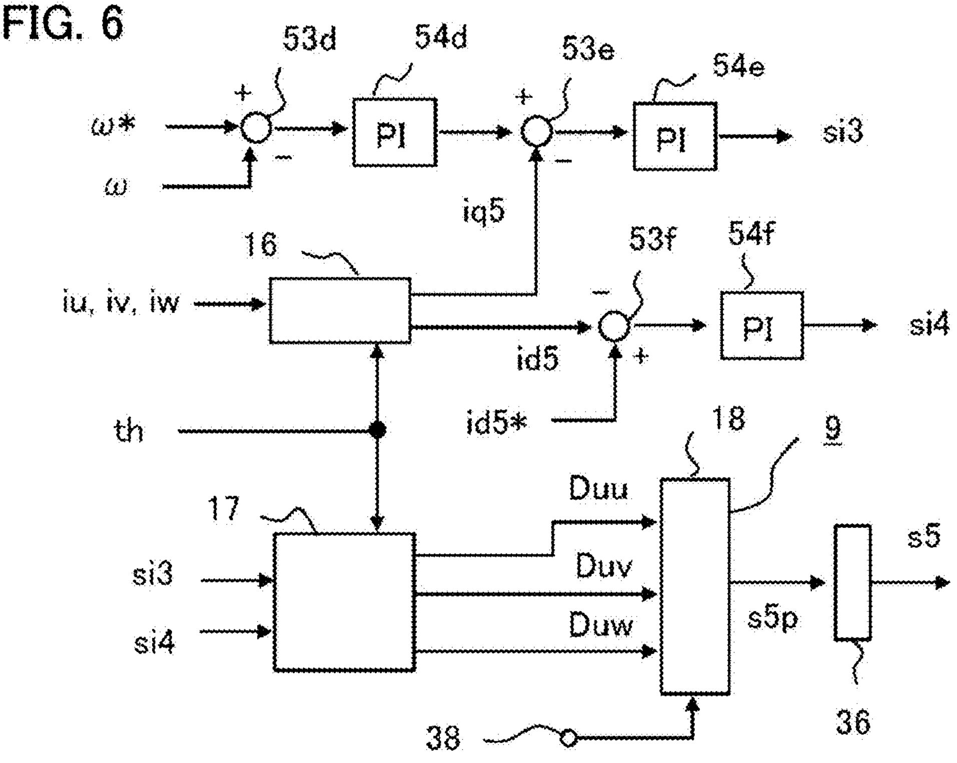
FIG. 6 is a diagram showing a configuration of an inverter control circuit in FIG. 4.
Figure 7:
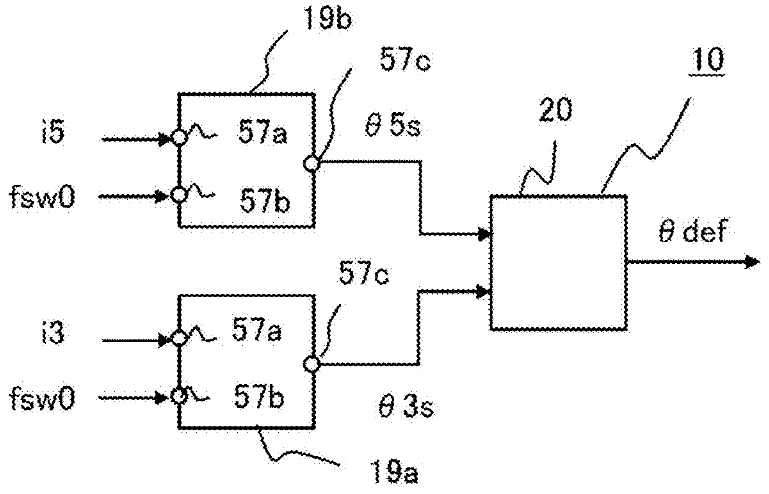
Figure 8:
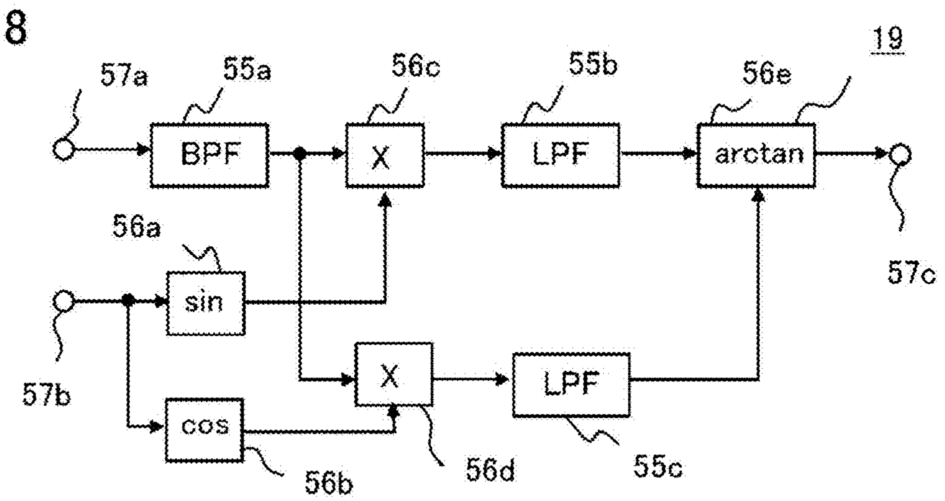
FIG. 8 is a diagram showing a configuration of a phase detector in FIG. 7.
Figure 9:
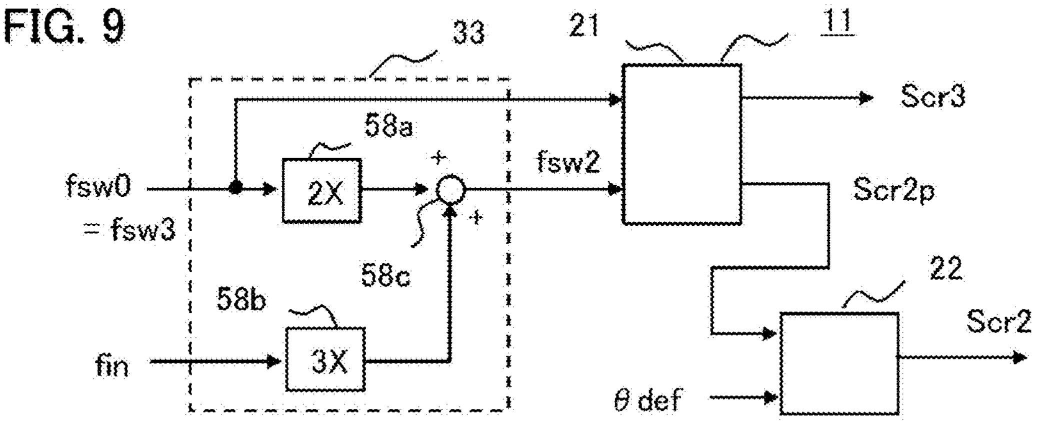
FIG. 9 is a diagram showing a configuration of a first example of a carrier wave generation circuit in FIG. 4.
Figure 10:
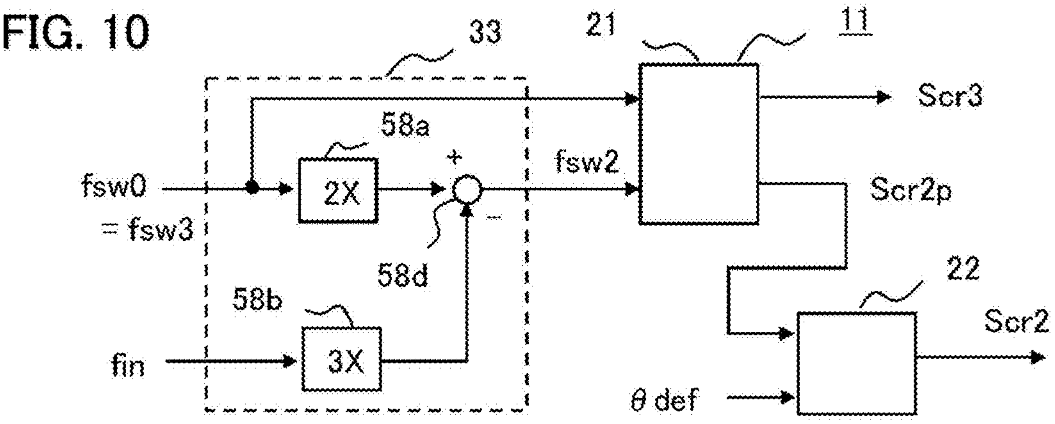
FIG. 10 is a diagram showing a configuration of a second example of the carrier wave generation circuit in FIG. 4.
Figure 11:
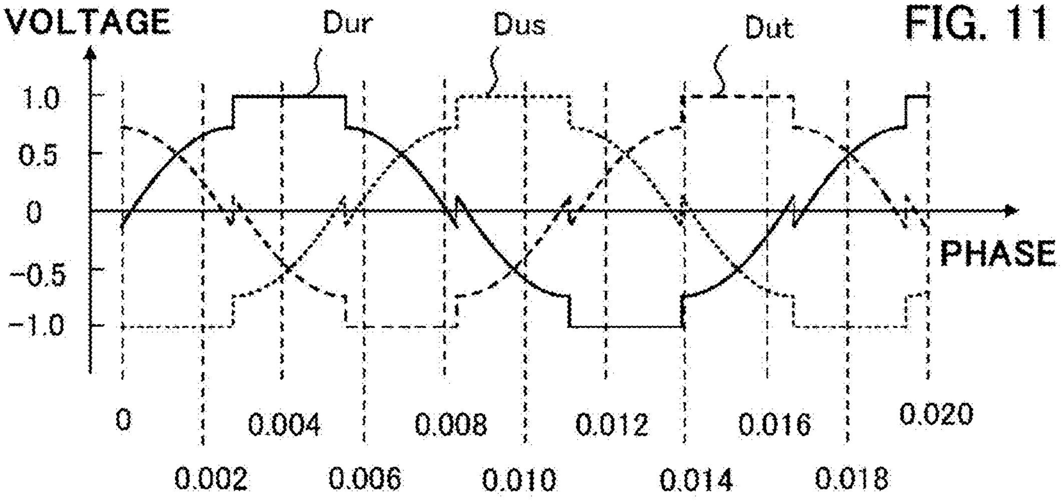
FIG. 11 is a graph showing a first example of duty rate signals generated by the converter control circuit of FIG. 5.
Figure 12:
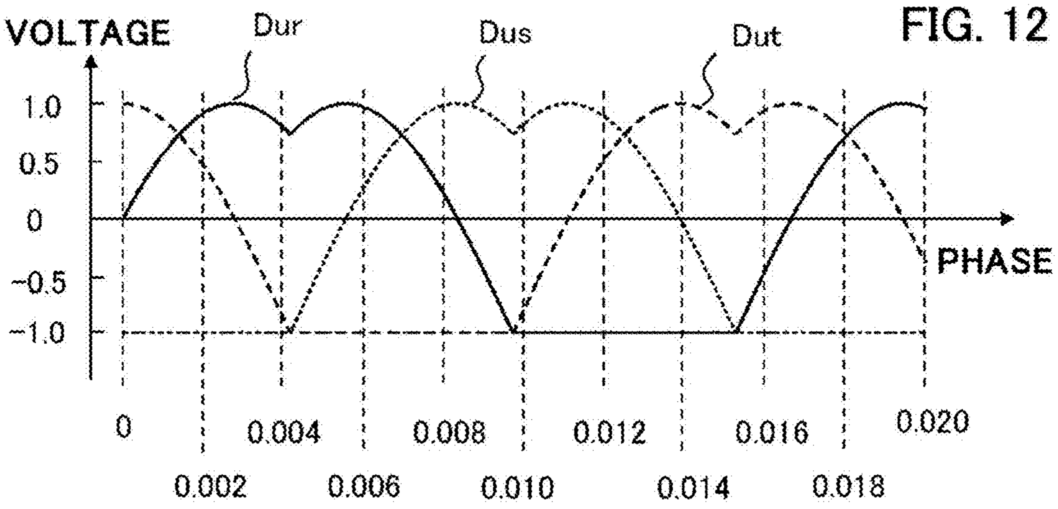
FIG. 12 is a graph showing a second example of the duty rate signals generated by the converter control circuit of FIG. 5.
Figure 13:
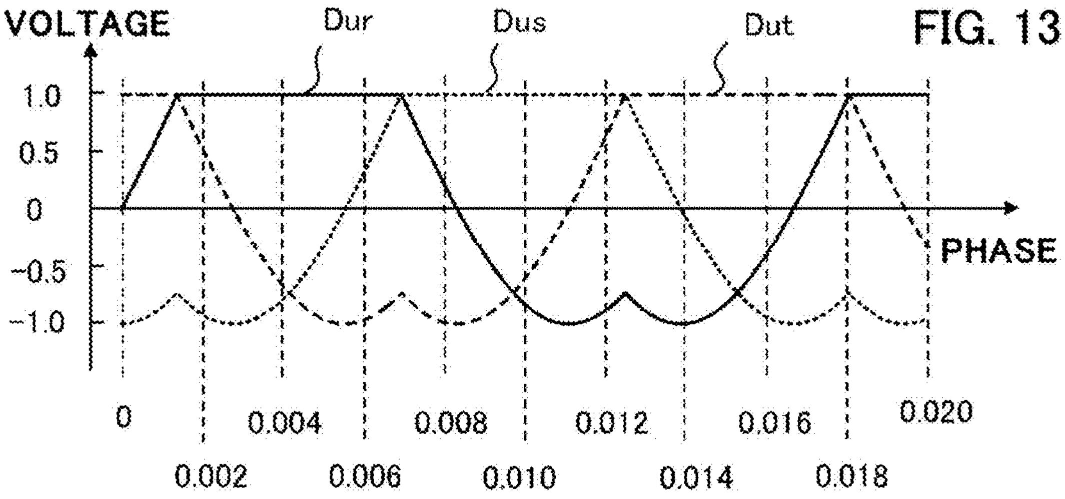
FIG. 13 is a graph showing a third example of the duty rate signals generated by the converter control circuit of FIG. 5.
Figure 14:
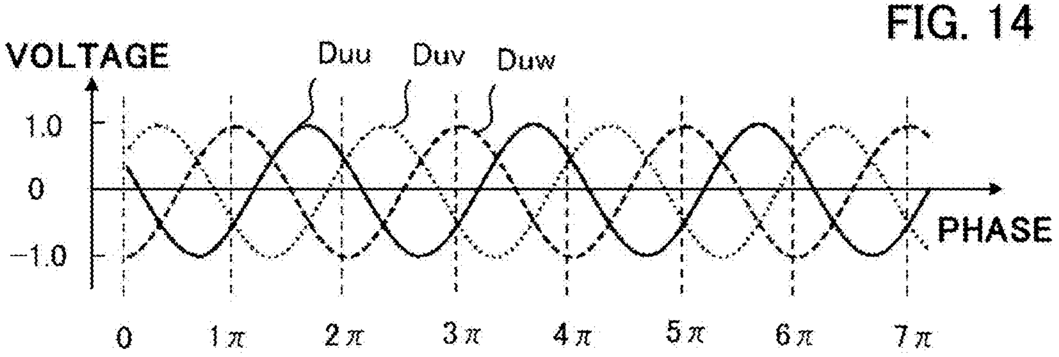
FIG. 14 is a graph showing a first example of duty rate signals generated by the inverter control circuit of FIG. 6.
Figure 15:
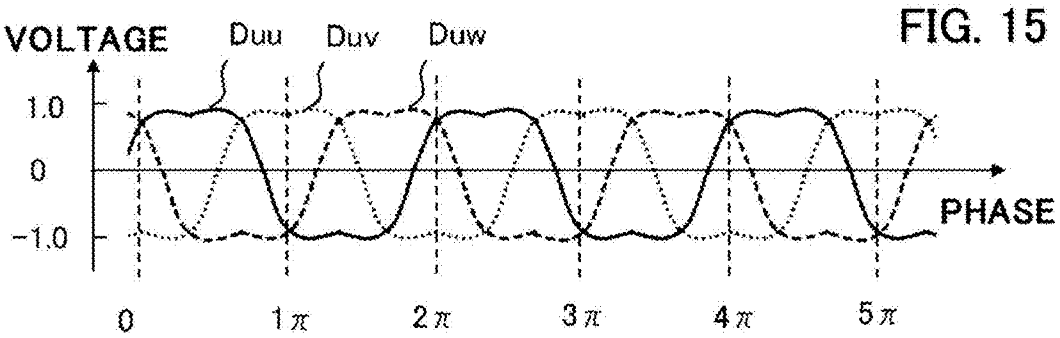
FIG. 15 is a graph showing a second example of the duty rate signals generated by the inverter control circuit of FIG. 6.
Figure 16:
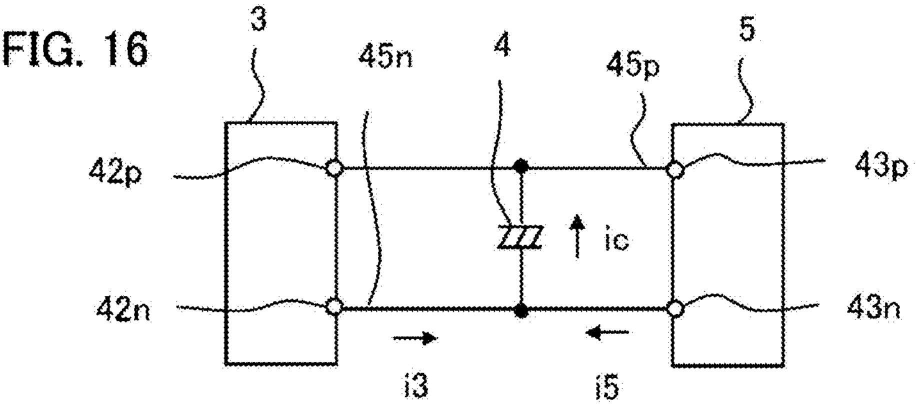
FIG. 16 is a diagram for illustrating a current flowing across a capacitor in FIG. 1.
Figure 17:
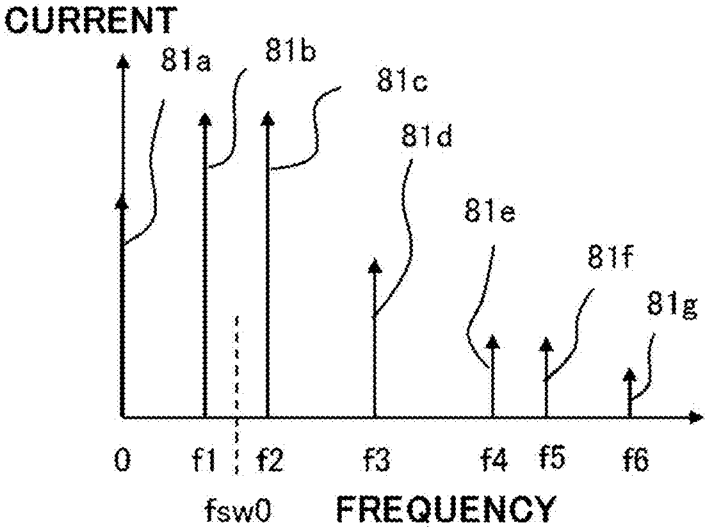
FIG. 17 is a graph showing frequency components based on a two-phase modulation method in a capacitor current in FIG. 16.
Figure 18:
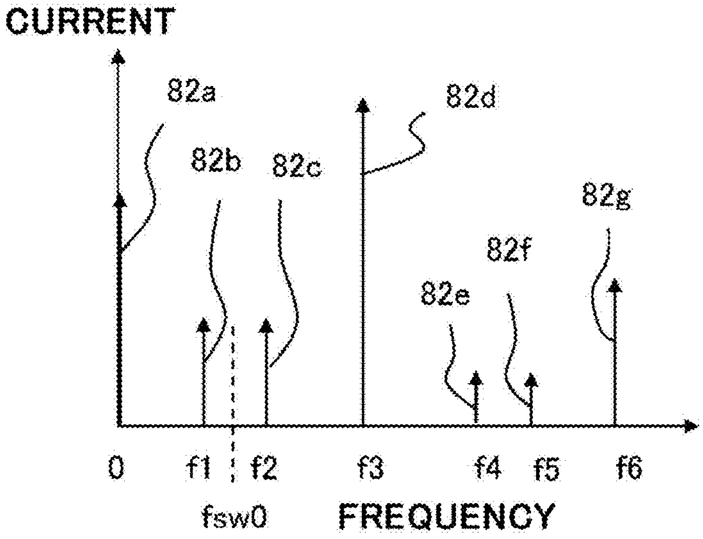
FIG. 18 is a graph showing frequency components based on a three-phase modulation method in the capacitor current in FIG. 16.
Figure 19:
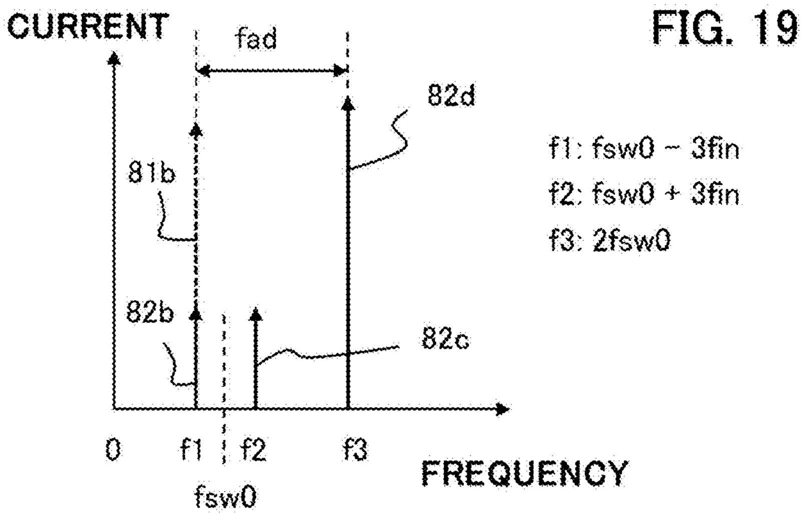
FIG. 19 is a graph showing a first example of an adjustment frequency according to Embodiment 1.
Figure 20:
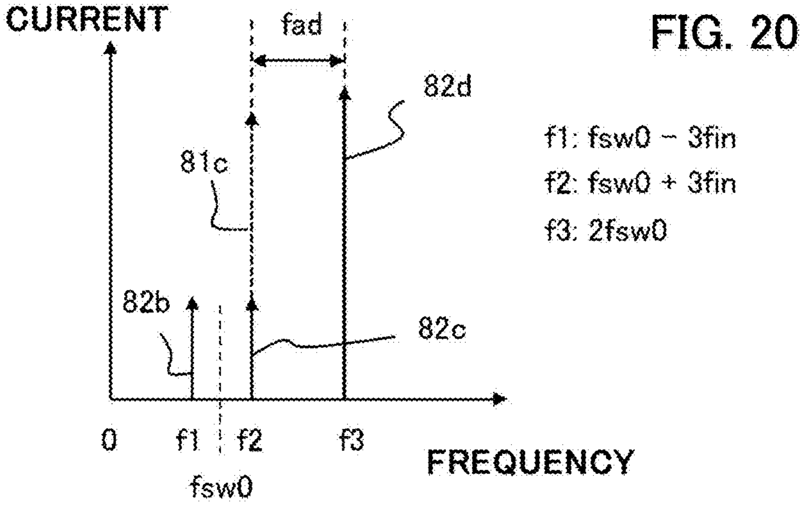
FIG. 20 is a graph showing a second example of an adjustment frequency according to Embodiment 1.
Figure 21:
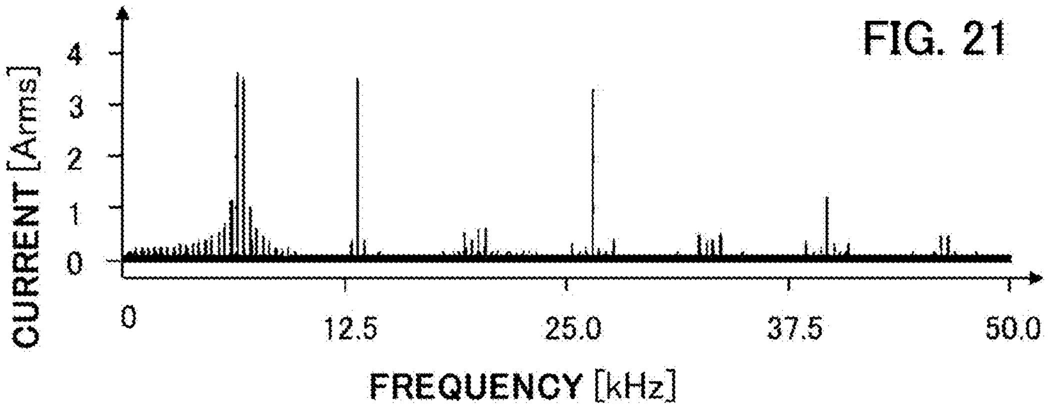
FIG. 21 is a graph showing frequency components in a capacitor current of a power conversion device as a comparative example.

FIG. 1 is a diagram showing a configuration of a power conversion device according to Embodiment 1. FIG. 2 is a diagram showing a configuration of a converter in FIG. 1, and FIG. 3 is a diagram showing a configuration of an inverter in FIG. 1. FIG. 4 is a diagram showing a configuration of a control circuit in FIG. 1, and FIG. 5 is a diagram showing a configuration of a converter control circuit in FIG. 4. FIG. 6 is a diagram showing a configuration of an inverter control circuit in FIG. 4, and FIG. 7 is a diagram showing a configuration of a carrier phase calculation circuit in FIG. 4. FIG. 8 is a diagram showing a configuration of a phase detector in FIG. 7. FIG. 9 and FIG. 10 are diagrams showing, respectively, configurations of a first example and a second example of a carrier wave generation circuit in FIG. 4. FIG. 11, FIG. 12 and FIG. 13 are graphs showing, respectively, a first example, a second example and a third example of duty rate signals generated by the converter control circuit of FIG. 5. FIG. 14 and FIG. 15 are graphs showing, respectively, a first example and a second example of duty rate signals generated by the inverter control circuit of FIG. 6. FIG. 16 is a diagram for illustrating a current flowing across a capacitor in FIG. 1. FIG. 17 and FIG. 18 are graphs showing, respectively, frequency components based on a two-phase modulation method and those based on a three-phase modulation method, in a capacitor current in FIG. 16. FIG. 19 and FIG. 20 are diagrams showing, respectively, a first example and a second example of an adjustment frequency according to Embodiment 1. FIG. 21 is a graph showing frequency components in a capacitor current of a power conversion device as a comparative example, and FIG. 22 is a graph showing frequency components in the capacitor current of the power conversion device according to Embodiment 1. FIG. 23 is a diagram showing another example of a frequency generation circuit in FIG. 9 or FIG. 10. A power conversion device 100 shown as an example in FIG. 1 is a power conversion device which supplies to an electric motor 6 as a load, second AC power converted from first AC power inputted from an AC power source 1. The power conversion device 100 includes: a main circuit 90 that supplies to the electric motor 6 as a load, the second AC power converted from the first AC power inputted from the AC power source 1: a control circuit 7 that controls the main circuit 90; voltage detectors 48*a*, 48*b*, 48*c*, 48*d* that each detect a voltage in the main circuit 90; current detectors 49*a*, 49*b*, 49*c*, 49*d*, 49*e*, 49*f*, 49*g*, 49*h* that each detect a current in the main circuit 90; and a detector 39 that detects status information of the electric motor 6, such as a phase th, a speed ω, etc, thereof.

The main circuit 90 includes: a power line 51 through which the first AC power that is AC power outputted from the AC power source 1 for three phases is transferred; reactors 2 interposed in the power line 51 for three phases: a converter 3 that converts the first AC power to DC power: a high-potential side line 45*p* and a low-potential side line 45*n* through which the DC power outputted from the converter 3 is transferred: an inverter 5 that converts the DC power outputted from the converter 3 to the second AC power that is AC power with any given predetermined frequency: a power line 52 through which the second AC power outputted from the inverter 5 is transferred to the electric motor 6 as a load: and a capacitor 4 that is connected between the high-potential side line 45*p* and the low-potential side line 45*n*. The three-phase power line 51 includes an r-phase power line 51*r*, an s-phase power line 51*s* and a t-phase power line 51*t*. The power line 52 for three phases includes a u-phase power line 52*u*, a v-phase power line 52*v* and a w-phase power line 52*w*. The reactors 2 are used for limiting three-phase AC currents flowing in the three-phase power line 51, and are interposed in the respective r-phase, s-phase, t-phase power lines 51*r*, 51*s*, 51*t*.

The converter 3 includes three legs in each of which two switching elements, namely, two arms are connected in series between a high-potential side line 71*p* and a low-potential side line 71*n*, and the respective phase lines of the three-phase power line 51 are connected to the respective legs at their midpoints (connection points). The midpoints of the respective legs in the converter 3 are connected to the respective phase of the AC power source 1 through the power line 51. In the converter 3, each one of the arms is configured with two power conversion elements, that is, a transistor Tr, for example, an IGBT (Insulated Gate Bipolar Transistor) or the like and a flywheel diode d connected in reverse parallel to the transistor Tr. The converter 3 shown in FIG. 2 includes six arms, namely, six switching elements Q3*a* to Q3*f*. The leg that is configured by connecting the switching element Q3*a* and the switching element Q3*b* in series has, between these two switching elements Q3*a*, Q3*b*, an AC input terminal 41*r* to which AC power is inputted. The leg that is configured by connecting the switching element Q3*c* and the switching element Q3*d* in series has, between these two switching elements Q3*c*, Q3*d*, an AC input terminal 41*s* to which AC power is inputted. The leg that is configured by connecting the switching element Q3*e* and the switching element Q3*f* in series has, between these two switching elements Q3*e*, Q3*f*, an AC input terminal 41*t* to which AC power is inputted. For the switching elements in the converter 3, where appropriate, a sign Q3 is used collectively, and signs Q3*a* to Q3*f* are used when they are to be described distinctively.

A gate of the switching element Q3*a* is connected to a control terminal 46*a* to which a control signal s3*a* is inputted, and a gate of the switching element Q3*b* is connected to a control terminal 46*b* to which a control signal s3*b* is inputted. Likewise, a gate of the switching element Q3*c* is connected to a control terminal 46*c* to which a control signal s3*c* is inputted, and a gate of the switching element Q3*d* is connected to a control terminal 46*d* to which a control signal s3*d* is inputted. A gate of the switching element Q3*e* is connected to a control terminal 46*e* to which a control signal s3*e* is inputted, and a gate of the switching element Q3*f* is connected to a control terminal 46*f* to which a control signal s3*f* is inputted. The converter 3 includes DC output terminals 42*p*, 42*n* from which DC power is outputted. The high-potential side line 71*p* is connected through the DC output terminal 42*p* to the high-potential side line 45*p*, and the high-potential side line 71*n* is connected through the DC output terminal 42*n* to the high-potential side line 45*n*. For the control signals of the converter 3, a sign s3 is used collectively, and signs s3*a* to s3*f* are used when they are to be described distinctively.

The inverter 5 includes three legs in each of which two switching elements, namely, two arms are connected in series between a high-potential side line 72*p* and a low-potential side line 72*n*, and the respective phase lines of the three-phase power line 52 are connected to the respective legs at their midpoints. The midpoints of the respective legs in the inverter 5 are connected to the respective phase of the electric motor 6 through the three-phase power line 52. In the inverter 5, each one of the arms is configured with two power conversion elements, that is, a transistor Tr, for example, an IGBT or the like and a flywheel diode d connected in reverse parallel to the transistor Tr. The inverter 5 shown in FIG. 3 includes six arms, namely, six switching elements Q5*a* to Q5*f*. The leg that is configured by connecting the switching element Q5*a* and the switching element Q5*b* in series has, between these two switching elements Q5*a*, Q5*b*, an AC output terminal 44*u* from which AC power is outputted. The leg that is configured by connecting the switching element Q5*c* and the switching element Q5*d* in series has, between these two switching elements Q5*c*, Q5*d*, an AC output terminal 44*v* from which AC power is outputted. The leg that is configured by connecting the switching element Q5*e* and the switching element Q5*f* in series has, between these two switching elements Q5*e*, Q5*f*, an AC output terminal 44*w* from which AC power is outputted. For the switching elements in the inverter 5, where appropriate, a sign Q5 is used collectively, and signs Q5*a* to Q5*f* are used when they are to be described distinctively.

A gate of the switching element Q5*a* is connected to a control terminal 47*a* to which a control signal s5*a* is inputted, and a gate of the switching element Q5*b* is connected to a control terminal 47*b* to which a control signal s5*b* is inputted. Likewise, a gate of the switching element Q5*c* is connected to a control terminal 47*c* to which a control signal s5*c* is inputted, and a gate of the switching element Q5*d* is connected to a control terminal 47*d* to which a control signal s5*d* is inputted. A gate of the switching element Q5*e* is connected to a control terminal 47*e* to which a control signal s5*e* is inputted, and a gate of the switching element Q5*f* is connected to a control terminal 47*f* to which a control signal s5*f* is inputted. The inverter 5 includes DC input terminals 43*p*, 43*n* to which DC power is inputted. The high-potential side line 72*p* is connected through the DC input terminal 43*p* to the high-potential side line 45*p*, and the low-potential side line 72*n* is connected through the DC input terminal 43*n* to the low-potential side line 45*n*. For the control signals of the inverter 5, a sign s5 is used collectively, and signs s5*a* to s5*f* are used when they are to be described distinctively.

The capacitor 4 is used for smoothing the DC power outputted from the converter 3. For the capacitor 4, an aluminum electrolytic capacitor, a film capacitor or the like may be used singularly, or multiple capacitors of such type may be used in serial or parallel form. The switching elements Q3*a* to Q3*f* and Q5*a* to Q5*f* used in the converter 3 and the inverter 5 are not limited to IGBTs with flywheel diodes d connected in reverse parallel thereto. As each of the switching elements Q3*a* to Q3*f* and Q5*a* to Q5*f*, a MOSFET (Metal Oxide Semiconductor Field Effect Transistor) with a flywheel diode d connected in reverse parallel between its source and drain, a GaN-HEMT (Gallium Nitride-High Mobility Transistor) of a cascode type, or the like may be used. Further, as the flywheel diode d, a diode incorporated in an IGBT, a MOSFET or a GaN-HEMT may be used, or a separate diode may be provided externally.

The electric motor 6 is a load that is rotated by the three-phase AC power outputted from the inverter 5, which may be a synchronous machine or may be an induction machine. The control circuit 7 generates the control signals s3 of the converter 3 and the control signals s5 of the inverter 5, on the basis of voltages and currents inputted thereto, the status information of the electric motor 6 and command values inputted thereto from an upper-level control device, to thereby control the main circuit 90 of the power conversion device 100. The currents inputted to the control circuit 7 are: input currents ir, is, it of the respective phases with respect to the AC power inputted to the main circuit 90 from the three-phase AC power source 1: an output current i3 of the converter 3: an input current i5 of the inverter 5; and output currents iu, iv, iw of the respective phases with respect to the AC power outputted to the electric motor 6. The input currents ir, is, it are detected by the current detectors 49*a*, 49*b*, 49*c*, respectively. The output current i3 of the converter 3 and the input current i5 of the inverter 5 are detected by the current detectors 49*d*, 49*e*, respectively.

The output currents iu, iv, iw are detected by the current detectors **49*f*, 49*g*, 49*h***, respectively.

The voltages inputted to the control circuit 7 are: input voltages vrs, vst, vtr inputted to the main circuit 90 from the three-phase AC power source 1: and a DC voltage Vdc across the capacitor 4. The input voltages vrs, vst, vtr are detected by the voltage detectors **48*a*, 48*b*, 48*c*, respectively. The DC voltage Vdc is detected by the voltage detector 48*d***.

It is noted that, with respect to the input voltages inputted from the three-phase AC power source 1, namely, line voltages in the power line 51; the output currents of the three-phase AC power source 1, namely, phase currents in the power line 51: and input currents inputted to the electric motor 6, namely, phase currents in the power line 52; it is not necessary to detect all of these three-phase voltages/currents, and it is allowed to detect two of them and then to calculate the voltage/current corresponding to the remaining third phase in the control circuit 7. In that case, although the stability in control is lowered, it is possible to decrease the number of the detectors.

The power conversion device 100 of Embodiment 1 is an example in which the converter 3 is driven according to the two-phase modulation method and the inverter 5 is driven according to the three-phase modulation method. The control circuit 7 includes a converter control circuit 8, an inverter control circuit 9, a carrier phase calculation circuit 10 and a carrier wave generation circuit 11.

The converter control circuit 8 performs high power-factor control of the AC input currents on the basis of the detection values of the input voltages vrs, vst, vtr and the input currents ir, is, it that are inputted from the three-phase AC power source 1; the detection value of the DC voltage Vdc across the capacitor 4; and a DC voltage command value Vdc* and a d-axis current command value id3*, to thereby generate the control signals s3 to be outputted to the gates of the switching elements Q3*a* to Q3*f* in the converter 3. Using the control signals s3, the converter control circuit 8 performs PWM control of the converter 3. The configuration and operational details of the converter control circuit 8 will be described later.

The inverter control circuit 9 generates the control signals s5 to be outputted to the gates of the switching elements Q5*a* to Q5*f* in the inverter 5, on the basis of the detection values of the output currents iu, iv, iw outputted to the electric motor 6, and those of the phase th and the speed ω as status information of the electric motor 6; and a speed command value ω* and a d-axis current command value id*5. Using the control signals s5, the inverter control circuit 9 performs PWM control of the inverter 5. The configuration and operational details of the inverter control circuit 9 will be described later.

The carrier phase calculation circuit 10 calculates a carrier phase difference θdef that is a phase difference between a first carrier wave used for generating the control signals s3 of the converter 3 and a second carrier wave used for generating the control signals s5 of the inverter 5. More specifically, on the basis of the detection value of the output current i3 of the converter 3, the detection value of the input current i5 of the inverter 5 and a predetermined reference frequency fsw0, the carrier phase calculation circuit 10 calculates the carrier phase difference θdef that is a phase difference between the phase of a carrier ripple current on the converter side generated due to PWM control and the phase of a carrier ripple current on the inverter side generated due to PWM control. In the output current i3 of the converter 3, the carrier ripple current of the converter 3 is included, and in the input current i5 of the inverter 5, the carrier ripple current of the inverter 5 is included.

The carrier wave generation circuit 11 generates a carrier wave Scr2 based on the two-phase modulation method and a carrier wave Scr3 based on the three-phase modulation method, on the basis of the carrier phase difference θdef of the carrier ripple currents, the reference frequency fsw0, and an input-side frequency, namely, a frequency fin of the AC power source 1. The configuration and operational details of the carrier wave generation circuit 11 will be described later.

Next, operations of the power conversion device 100 according to Embodiment 1 will be described. The power conversion device 100 increases the DC voltage Vdc across the capacitor 4 up to an intended value while performing, using the converter 3, high power-factor control of AC currents inputted from the three-phase AC power source 1, namely, the input currents ir, is, it, and then converts, using the inverter 5, that voltage to AC power having a given and desired frequency, to thereby operate the electric motor 6 as a load. Here, a case will be described where the power conversion device 100 operates the electric motor 6 by using AC currents, namely, the output currents iu, iv, iw.

Operations of the converter control circuit 8 will be described using FIG. 5. The converter control circuit 8 includes: a PLL (Phase Locked Loop) calculator 12; a d-q converter 13: a d-q reverse converter 14: a carrier comparator 15; a gate drive circuit 35; adder-subtractors **53*a*, 53*b*, 53*c*; and calculators 54*a*, 54*b*, 54*c*. The PLL calculator 12 calculates phase information θi synchronized with AC waveforms from the detection values of the input voltages vrs, vst, vtr of the three-phase power source 1. By the adder-subtractor 53*a* and the calculator 54*a***, PI (Proportional Integral) control is performed on the difference between the DC voltage Vdc and the DC voltage command value Vdc*, so that a command value (an output of the calculator **54*a***) for controlling the DC voltage Vdc to have the DC voltage command value Vdc* is generated. Using the phase information θi, the d-q converter 13 performs d-q conversion on the input currents ir, is, it inputted from the three-phase Ac power source 1, to thereby generate therefrom a q-axis current iq3 as an active current component and a d-axis current id3 as a reactive current component.

By the adder-subtractor **53*b* and the PI calculator 54*b*, PI control is performed so as to cause the q-axis current iq3 to follow the command value outputted from the calculator 54*a*, so that a q-axis signal si1 is generated. In order to perform high power-factor control of the input currents ir, is, it from the three-phase AC power source 1, by the adder-subtractor 53*c* and the calculator 54*c*, PI control is performed so as to cause the d-axis current id3 to follow the d-axis current command value id3* that is basically zero, so that a d-axis signal si2 is generated. The d-q reverse converter 14 generates duty rate signals Dur, Dus, Dut, on the basis of the phase information θi, the q-axis signal si1 and the d-axis signal si2. By the carrier comparator 15, the duty rate signals Dur, Dus, Dut are compared with the carrier wave Scr2 based on the two-phase modulation method and inputted from a carrier-wave input terminal 37, to thereby generate digital control signals s3*p* for performing PWM control. The gate drive circuit 35 generates the analog control signals s3 from the digital control signals s3*p***.

As the duty rate signals Dur, Dus, Dut based on the two-phase modulation method, signals shown in each of FIG. 11 to FIG. 13 may be employed. A first example of the duty rate signals Dur, Dus, Dut shown in FIG. 11 are so-called "top/bottom attach signals". A second example of the duty rate signals Dur, Dus, Dut shown in FIG. 12 are so-called "bottom attach signals". A third example of the duty rate signals Dur, Dus, Dut shown in FIG. 13 are so-called "top attach signals". In FIG. 11, FIG. 12, FIG. 13, the ordinate represents a voltage, and the abscissa represents a phase.

It is noted that the calculators 54*a*, 54*b*, 54*c* shown in the converter control circuit 8 of FIG. 5 are not limited to performing PI control, and may perform P (Proportional) control, I (Integral) control or PID (Proportional Integral Differential) control.

Operations of the inverter control circuit 9 will be described using FIG. 6. The inverter control circuit 9 includes: a d-q converter 16; a d-q reverse converter 17; a carrier comparator 18: a gate drive circuit 36; adder-subtractors 53*d*, 53*e*, 53*f*; and calculators 54*d*, 54*e*, 54*f*. By the adder-subtractor 53*d* and the calculator 54*d*, PI control is performed on the difference between the speed ω of the electric motor 6 and the speed command value ω*, so that a command value (an output of the calculator 54*d*) for controlling the speed ω to follow the speed command value ω* is generated. Using the phase th, the d-q converter 16 performs d-q conversion on the output currents iu, iv, iw to be outputted to the electric motor 6, to thereby generate therefrom a q-axis current iq5 as an active current component and a d-axis current id5 as a reactive current component.

In order to perform high power-factor control of the output currents iu, iv, iw to be outputted to the electric motor 6, by the adder-subtractor 53*f* and the PI calculator 54*f*, PI control is performed so as to cause the d-axis current id5 to follow the d-axis current command value id5* that is basically zero, so that a d-axis signal si4 is generated. By the adder-subtractor 53*e* and the PI calculator 54*e*, PI control is performed so as to cause the q-axis current iq5 to follow the command value outputted from the calculator 54*d*, so that a q-axis signal si3 is generated. The d-q reverse converter 17 generates duty rate signals Duu, Duv, Duw, on the basis of the phase th of the electric motor 6, the q-axis signal si3 and the d-axis signal si4. By the carrier comparator 18, the duty rate signals Duu, Duv, Duw are compared with the carrier wave Scr3 based on the three-phase modulation method and inputted from a carrier-wave input terminal 38, to thereby generate digital control signals s5*p* for performing PWM control. The gate drive circuit 36 generates the analog control signals s5 from the digital control signals s5*p*. The inverter control circuit 9 generates the control signals s5 that are different in modulation method from the control signals s3 and that control a plurality of switching elements Q5*a* to Q5*f* in the inverter 5, on the basis of the carrier signal Scr3 based on the three-phase modulation method and having a frequency and a phase that are different from those of the carrier signal Scr2 based on the two-phase modulation method.

As the duty rate signals Duu, Duv, Duw based on the three-phase modulation method, signals shown in FIG. 14 or FIG. 15 may be employed. A first example of the duty rate signals Duu, Duv, Duw shown in FIG. 14 are sinusoidal signals. A second example of the duty rate signals Duu, Duv, Duw shown in FIG. 15 are third-order superimposed-wave signals. In FIG. 14 and FIG. 15, the ordinate represents a voltage, and the abscissa represents a phase.

It is noted that the calculators 54*d*, 54*e*, 54*f* shown in the inverter control circuit 9 of FIG. 6 are not limited to performing PI control, and may perform P control, I control or PID control.

Operations of the carrier phase calculation circuit 10 will be described using FIG. 7 and FIG. 8. The carrier phase calculation circuit 10 includes: a phase detector 19*a* that detects, on the basis of the output current i3 of the converter 3 and the reference frequency fsw0, a phase θ3*s* that is a phase of a component corresponding to the reference frequency fsw0 in the output current i3 as a current on the side of the converter 3: a phase detector 19*b* that detects, on the basis of the input current i5 of the inverter 5 and the reference frequency fsw0, a phase θ5*s* that is a phase of a component corresponding to the reference frequency fsw0 in the input current i5 as a current on the side of the inverter 5; and a phase difference calculator 20 that calculates the carrier phase difference θdef that is a phase difference between the phase θ3*s* and phase θ5*s*.

For example, the phase detectors 19*a*, 19*b* are each a phase detector 19 shown in FIG. 8. The phase detector 19 shown in FIG. 8 generates a sine wave and a cosine wave with the reference frequency fsw0 inputted through a terminal 57*b*, and multiplies them by a frequency component corresponding to fsw0 that is obtained from a current inputted through a terminal 57*a* and after subjecting it to band limitation using a BPF (Band Pass Filter), to thereby extract a sine wave component and a cosine wave component as components having a desired frequency. An arctangent of them is calculated, so that the phase of the thus-inputted current is calculated. The configuration of the phase detector 19 will be detailed. The phase detector 19 includes filters 55*a*, 55*b*, 55*c* and calculators 56*a*, 56*b*, 56*c*, 56*d*, 56*e*. The filter 55*a* is a BPF and the filters 55*b*, 55*c* are each a LPF (Low Pass Filter). The calculator 56*a* calculates the sine wave component, and the calculator 56*b* calculates the cosine wave component. The calculators 56*c*, 56*d* each multiply its two inputs together. The calculator 56*e* calculates the arctangent from the sine wave component and the cosine wave component, and outputs the phase from a terminal 57*c*.

With respect to the phase detector 19*a*, the output current i3 and the reference frequency fsw0 are inputted thereto through the terminals 57*a*, 57*b*, respectively, and the phase θ3*s* of the component corresponding to the reference frequency fsw0 in the output current i3 is outputted from the terminal 57*c*. With respect to the phase detector 19*b*, the input current i5 and the reference frequency fsw0 are inputted thereto through the terminals 57*a*, 57*b*, respectively, and the phase θ5*s* of the component corresponding to the reference frequency fsw0 in the input current i5 is outputted from the terminal 57*c*.

The directions of the input current i5, the output current i3 and a capacitor current ic are indicated by the respective arrow directions shown in FIG. 16. Note that, for deriving the carrier phase difference θdef, the use of the circuit shown in FIG. 7 is not limitative. For example, the difference may be detected by the installation of a phase difference detection IC (Integrated Circuit). Further, the calculation of the carrier phase difference θdef may be executed by hardware or may be executed by software. Furthermore, the carrier phase difference θdef may be obtained in such a manner that a table of respective phase difference data corresponding to load conditions is incorporated beforehand, and data in the table is read out whenever necessary.

Operations of the carrier wave generation circuit 11 will be described using FIG. 9, FIG. 10, FIG. 17 to FIG. 20 and FIG. 23. As described previously, the carrier wave generation circuit 11 generates the carrier wave Scr2 based on the two-phase modulation method and the carrier wave Scr3 based on the three-phase modulation method, on the basis of the carrier phase difference θdef of the carrier ripple currents, the reference frequency fsw0, and the input-side frequency, namely, the frequency fin of the AC power source 1. A carrier wave frequency fsw2 of the carrier wave Scr2 based on the two-phase modulation method and a carrier wave frequency fsw3 of the carrier wave Scr3 based on the three-phase modulation method have a predetermined relationship therebetween based on a current flowing into the capacitor 4 or a current flowing out of the capacitor 4, namely, the capacitor current ic. When the relationship between the carrier wave frequency fsw2 and the carrier wave frequency fsw3 satisfies a formula (1) or a formula (2), it is possible to sufficiently suppress the carrier ripple currents flowing into the capacitor 4 as compared with the comparative example as represented by the power conversion system of Patent Document 1 in which the converter and the inverter that are different in modulation method are operated using the carrier waves whose frequencies are the same.

$$fsw2 = 2 \times fsw3 + 3 \times fin \tag{1}$$

$$fsw2 = 2 \times fsw3 - 3 \times fin \tag{2}$$

When the formula (1) or the formula (2) is satisfied, the largest frequency component in the carrier ripple current based on the two-phase modulation method and the largest frequency component in the carrier ripple current based on the three-phase modulation method can be matched with each other. In FIG. 17, a result of FFT (Fast Fourier Transform) with respect to a current based on the two-phase modulation method that is inputted to, or outputted from the capacitor 4, namely, the capacitor current ic, is summarized. In FIG. 18, a result of FFT with respect to a current based on the three-phase modulation method that is inputted to, and outputted from the capacitor 4, namely, the capacitor current ic, is summarized. In FIG. 17 and FIG. 18, the ordinate represents a current and the abscissa represents a frequency. Note that in FIG. 17 and FIG. 18, only high-level frequency components are illustrated. A frequency f1 equals to "fsw0−3×fin", and a frequency f2 equals to "fsw0+3×fin". A frequency f3 equals to "2×fsw0", and a frequency f4 equals to "3×fsw0−6×fin". A frequency f5 equals to "3×fsw0+6×fin", and a frequency f6 equals to "4×fsw0".

In FIG. 17, a frequency component 81*a* is a DC component. Frequency components 81*b*, 81*c*, 81*d*, 81*e*, 81*f*, 81*g* are components corresponding to the frequencies f1, f2, f3, f4, f5, f6, respectively. According to the two-phase modulation method, the frequency components 81*b*, 81*c* are each the largest frequency component. In FIG. 18, a frequency component 82*a* is a DC component. Frequency components 82*b*, 82*c*, 82*d*, 82*e*, 82*f*, 82*g* are components corresponding to the frequencies f1, f2, f3, f4, f5, f6, respectively. According to the three-phase modulation method, the frequency components 82*b* is the largest frequency component.

In FIG. 19, an adjustment frequency fad for matching the frequency of the frequency component 81*b* based on the two-phase modulation method and the frequency of the frequency component 82*d* based on the three-phase modulation method, with each other, is shown. In FIG. 20, an adjustment frequency fad for matching the frequency of the frequency component 81*c* based on the two-phase modulation method and the frequency of the frequency component 82*d* based on the three-phase modulation method, with each other, is shown. The frequency fad in FIG. 19 is represented by a formula (3), and the frequency fad in FIG. 20 is represented by a formula (4).

$$fad = fsw0 + 3 \times fin \tag{3}$$

$$fad = fsw0 - 3 \times fin \tag{4}$$

Let's assume a case where the carrier wave frequency fsw2 based on the two-phase modulation method is adjusted according to a formula (5) shown below.

$$fsw2 = fsw3 + fad \tag{5}$$

Here, when the reference frequency fsw0 is set as the carrier wave frequency fsw3, the formula (1) is provided from the formula (5) and the formula (3), and the formula (2) is provided from the formula (5) and the formula (4).

As shown in FIG. 17 and FIG. 18, the largest frequency components based on the two-phase modulation method and based on the three-phase modulation method emerge at mutually different frequencies. Let's consider the comparison example in which the converter 3 and the inverter 5 that are different in modulation method are driven using the same carrier wave frequency. In this case, since there is a difference in largest frequency component as shown in FIG. 17 and FIG. 18, if the converter 3 and the inverter 5 are driven using control signals whose carrier wave frequencies are the same, and further the phase of a current between the converter 3 and the inverter 5, namely, the current in the high-potential side line 45*p*, or a current on the side of the converter 3 in the low-potential side line 45*n*, is matched with the phase of a current on the side of the inverter 5 in that line, it is not possible to match the largest frequency components with each other, so that the current inputted to and outputted from the capacitor 4 cannot be reduced sufficiently. Namely, when the converter 3 and the inverter 5 are driven using control signals whose carrier wave frequencies are the same, it is not possible to sufficiently reduce the carrier ripple currents of the converter 3 and the inverter 5.

The power conversion device 100 of Embodiment 1 includes the converter 3 and the inverter 5 that are different in modulation method, and the carrier wave frequency fsw2 of the carrier wave Scr2 based on the two-phase modulation method and the carrier wave frequency fsw3 of the carrier wave Scr3 based on the three-phase modulation method have the predetermined relationship therebetween as represented by the formula (1) or the formula (2). Thus, when the phases of the current on the side of the converter 3 and the current on the side of the inverter 5 are matched with each other, it is possible to sufficiently reduce the carrier ripple currents of the converter 3 and the inverter 5. Note that such phase adjustment between the current on the side of the converter 3 and the current on the side of the inverter 5 is performed in order to cause their respective largest frequency components to be matched with each other at the same point of time. The reduction effect on the carrier ripple currents by the phase adjustment between the current on the side of the converter 3 and the current on the side of the inverter 5, becomes smaller as a difference in frequency from the calculation value calculated by the formula (1) or the formula (2) gets larger.

In FIG. 9, the carrier wave generation circuit 11 is shown that corresponds to the case where the carrier wave frequency fsw3 of the inverter 5 is set as the reference frequency fsw0 and the carrier wave frequency fsw2 of the converter 3 satisfies the formula (1). The carrier wave generation circuit 11 shown in FIG. 9 includes a frequency generation circuit 33, a carrier signal generator 21 and a phase delayer 22. The frequency generation circuit 33 generates the carrier wave frequencies fsw2, fsw3 on the basis of the reference frequency fsw0 and the frequency fin of the three-phase AC power source 1. The carrier signal generator 21 generates the carrier wave Scr3 that is a sawtooth-waveform or triangular-waveform signal whose frequency is the carrier wave frequency fsw3. Further, the carrier signal generator 21 generates a carrier wave Scr2*p* prior to the phase adjustment that is a sawtooth-waveform or triangle-waveform signal with the carrier wave frequency fsw2. The phase delayer 22 imparts the carrier phase difference θdef to the carrier wave Scr2*p* prior to the phase adjustment to thereby generate the carrier wave Scr2 after the phase adjustment.

The frequency generation circuit 33 shown in FIG. 9 includes calculators 58*a*, 58*b* and 58*c*. The calculator 58*a* doubles an input signal. The calculator 58*b* triples an input signal. The calculator 58*c* adds two input signals together.

In FIG. 10, the carrier wave generation circuit 11 is shown that corresponds to the case where the carrier wave frequency fsw3 of the inverter 5 is set as the reference frequency fsw0 and the carrier wave frequency fsw2 of the converter 3 satisfies the formula (2). The carrier wave generation circuit 11 shown in FIG. 10 differs in the circuit configuration of the frequency generation circuit 33, from the carrier wave generation circuit 11 shown in FIG. 9. Description will be made mainly on points different from the carrier wave generation circuit 11 shown in FIG. 9. The frequency generation circuit 33 shown in FIG. 10 includes calculators 58*a*, 58*b* and 58*d*. The calculator 58*a* doubles an input signal. The calculator 58*b* triples an input signal. The calculator 58*d* subtracts an input signal coming from the calculator 58*b* from an input signal coming from the calculator 58*a*.

In FIG. 9 and FIG. 10, the frequency generation circuits 33 are shown that correspond to the case where the carrier wave frequency fsw3 of the inverter 5 is set as the reference frequency fsw0; however, as shown in FIG. 23, the reference frequency fsw0 may be different from the carrier wave frequency fsw3. Another frequency generation circuit 33 shown in FIG. 23 differs from the frequency generation circuits 33 shown in FIG. 9 and FIG. 10 in that a calculator 58*e* is additionally provided on the input side of the calculator 58*a*. The calculator 58*e*, after a frequency "fsw3−fs" is inputted thereto as the reference frequency fsw0, adds the frequency fs to the thus-inputted reference frequency fsw0, to thereby generate the carrier wave frequency fsw3. Note that the other frequency generation circuit 33 shown in FIG. 23 is a circuit corresponding to the formula (1). In another circuit corresponding to the formula (2), like in FIG. 10, the output value of the calculator 58*b* at an input of the calculator 58*c* will be subtracted. Namely, the input of the calculator 58*c* on the output side of the calculator 58*b* shall be indicated instead by "−". The other frequency generation circuit 33 in this case shall be referred to as a subtraction type circuit. The formula (1) and the formula (2) each show a relationship between the carrier wave frequency fsw2 and the carrier wave frequency fsw3 and accordingly, the carrier wave generation circuit 11 that includes one of the frequency generation circuit 33 shown in FIG. 23 and the subtraction type circuit, can also generate, like the carrier wave generation circuits 11 of FIG. 9 and FIG. 10, the carrier wave frequencies fsw2 and fsw3 that satisfies the formula (1) or the formula (2).

According to the power conversion device 100 of Embodiment 1, since the converter 3 is driven using the control signals s3 generated in such a manner that the carrier wave Scr2 is inputted to the converter control circuit 8, and the inverter 5 is driven using the control signals s5 generated in such a manner that the carrier wave Scr3 is inputted to the inverter control circuit 9, it is possible to sufficiently suppress the carrier ripple currents flowing into the capacitor 4, as compared with the comparative example as represented by the power conversion system of Patent Document 1 in which the converter and the inverter that are different in modulation method are operated using the carrier waves whose frequencies are the same.

The reduction effect on the capacitor current ic of the capacitor 4 according to the power conversion device 100 of Embodiment 1 will be described using FIG. 21 and FIG. 22. In FIG. 22, an active value about the capacitor current ic of the capacitor 4 in the power conversion device 100 of Embodiment 1 is shown. In FIG. 21, an effective value about a capacitor current ic of a capacitor 4 in a power conversion device as a comparative example is shown. The comparative example power conversion device corresponds to the power conversion device of FIG. 1 when it is operated using the same carrier wave frequencies as the carrier wave frequency fsw2 for the converter 3 and the carrier wave frequency fsw3 for the inverter 5. In FIG. 21 and FIG. 22, the ordinate represents a current [Arms], and the abscissa represents a frequency [KHz]. The effective value about the capacitor current ic of the capacitor 4 in the comparative example power conversion device was 5.74 [Arms]. The effective value about the capacitor current ic of the capacitor 4 in the power conversion device 100 of Embodiment 1 was 4.68 [Arms].

It can be ascertained from FIG. 21 and FIG. 22 that, according to the power conversion device 100 of Embodiment 1, since the converter 3 and the inverter 5 are controlled by the control signals s3 and the control signals s5 that are different in modulation method, frequency and phase from each other and the respective frequencies of which have the predetermined relationship therebetween, the capacitor current ic of the capacitor 4 could be reduced. According to the power conversion device 100 of Embodiment 1, it is possible to reduce the capacitor current ic of the capacitor 4 to thereby suppress the heat generation of the capacitor 4. This makes it possible to use the capacitor 4 that is smaller than that of the comparative example power conversion device.

As described above, the power conversion device 100 of Embodiment 1 supplies to a load (electric motor 6), the second AC power converted from the first AC power inputted from the AC power source 1. The power conversion device 100 includes the converter 3 that converts the first AC power inputted from the AC power source 1 to DC power: the inverter 5 that converts the DC power outputted from the converter 3 to the second AC power: the capacitor 4 that is connected between the high-potential side line 45*p* and the low-potential side line 45*n* through which the DC power is transferred; and the control circuit 7 that controls the converter 3 and the inverter 5. The control circuit 7 includes: the converter control circuit 8 that generates first control signals (control signals s3) that control a plurality of switching elements Q3*a*, Q3*b*, Q3*c*, Q3*d*, Q3*e*, Q3*f* in the converter 3, on the basis of a first carrier wave (carrier wave Scr2); the inverter control circuit 9 that generates second control signals (control signals s5) that are different in modulation method from the first control signals (control signals s3) and that control a plurality of switching elements Q5*a*, Q5*b*, Q5*c*, Q5*d*, Q5*e*, Q5*f* in the inverter 5, on the basis of a second carrier wave (carrier wave Scr3) having a frequency and a phase that are different from those of the first carrier wave (carrier wave Scr2); and the carrier wave generation circuit 11 that generates the first carrier wave (carrier wave Scr2) and the second carrier wave (carrier wave Scr3). The frequency (carrier wave frequency fsw2) of the first carrier wave (carrier wave Scr2) and the frequency (carrier wave frequency fsw3) of the second carrier wave (carrier wave Scr3) have a predetermined relationship therebetween based on the current flowing into the capacitor 4 or the current flowing out of the capacitor 4. According to the power conversion device 100 of Embodiment 1, because of that configuration, the converter 3 and the inverter 5 are controlled using, respectively, the first control signals (control signals s3) and the second control signals (control signals s5) that are different in modulation method, frequency and phase from each other and the respective frequencies of which have the predetermined relationship therebetween, so that the carrier ripple currents flowing into the capacitor 4 can be reduced efficiently.

Embodiment 2

Figure 24:
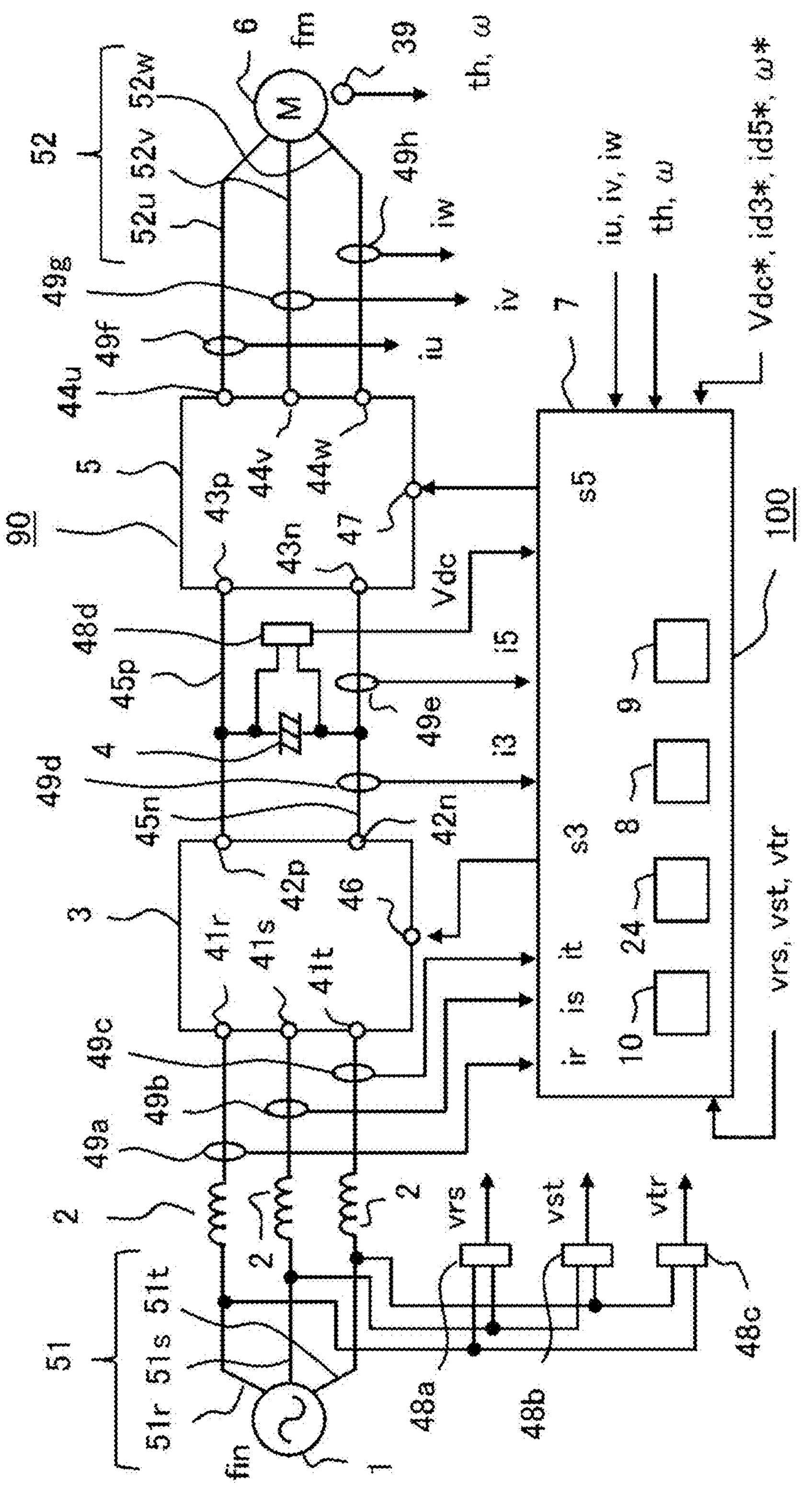
FIG. 24 is a diagram showing a configuration of a power conversion device according to Embodiment 2.
Figure 25:
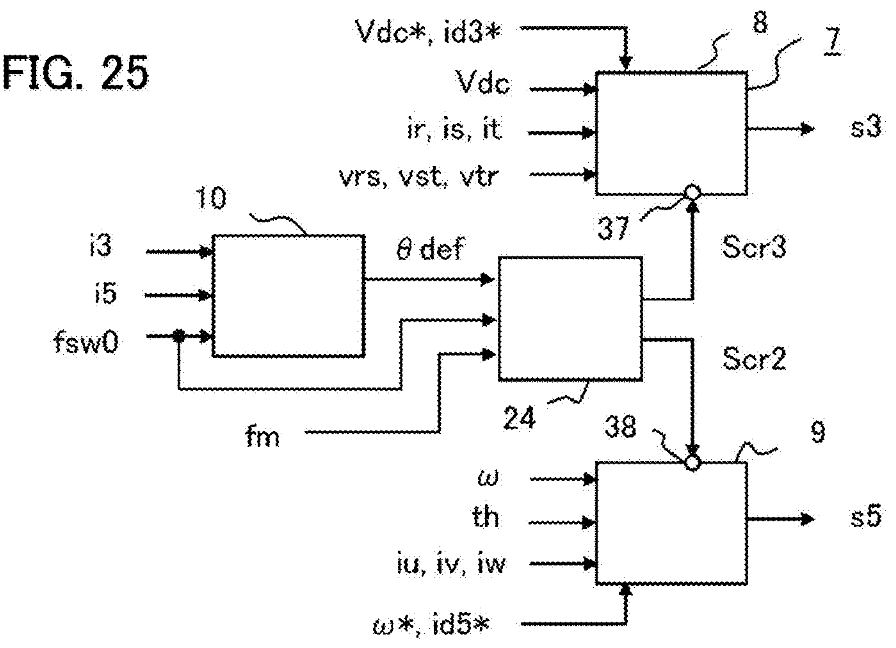
FIG. 25 is a diagram showing a configuration of a control circuit in FIG. 24.
Figure 26:
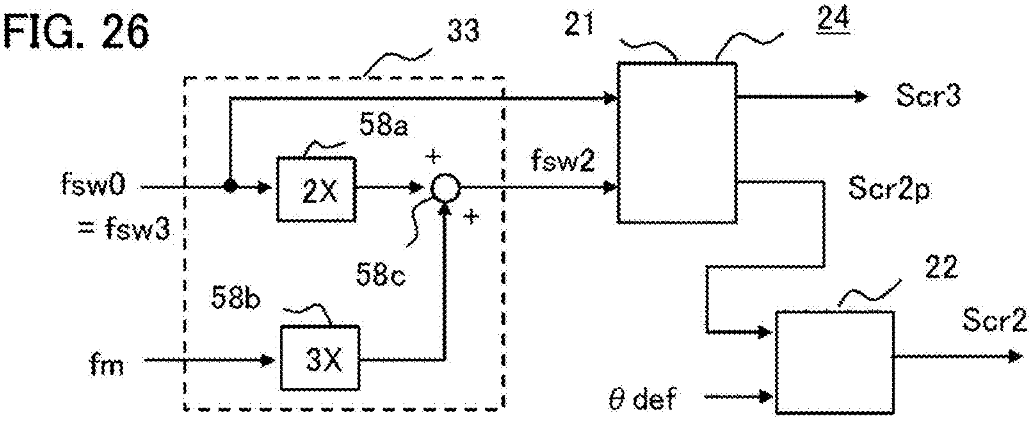
FIG. 26 is a diagram showing a configuration of a first example of a carrier wave generation circuit in FIG. 25.
Figure 27:
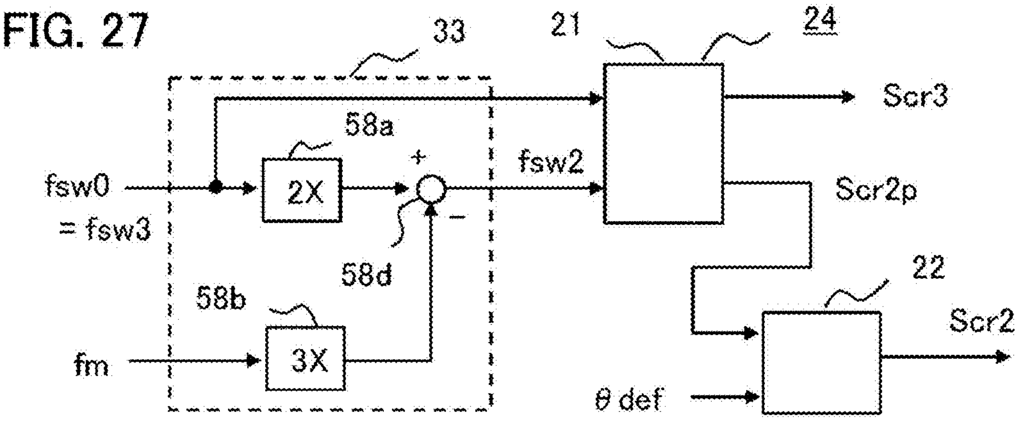
FIG. 27 is a diagram showing a configuration of a second example of the carrier wave generation circuit in FIG. 25.
Figure 28:
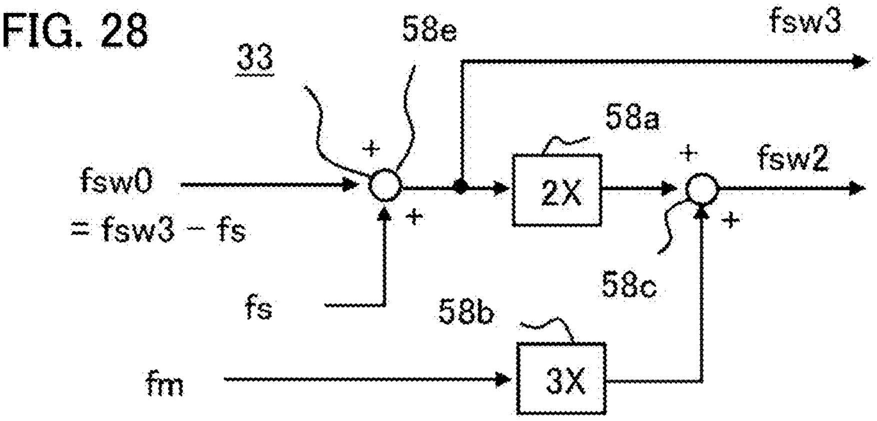
FIG. 28 is a diagram showing another example of a frequency generation circuit in FIG. 26 or FIG. 27.
Figure 29:
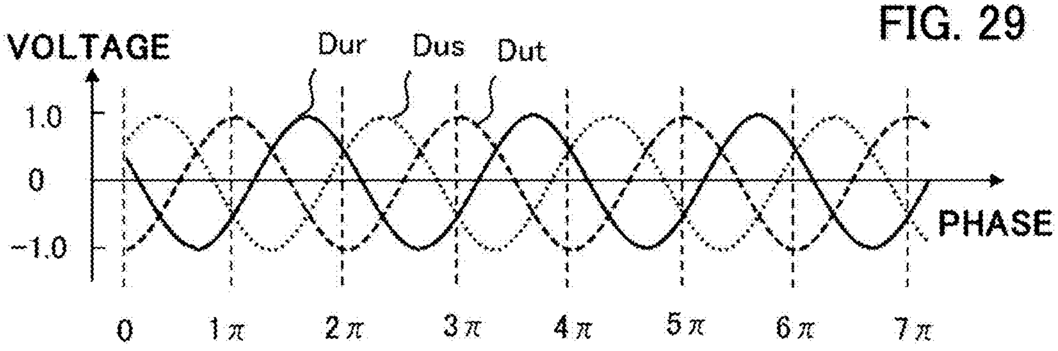
FIG. 29 is a graph showing duty rate signals generated by a converter control circuit in FIG. 25.
Figure 30:
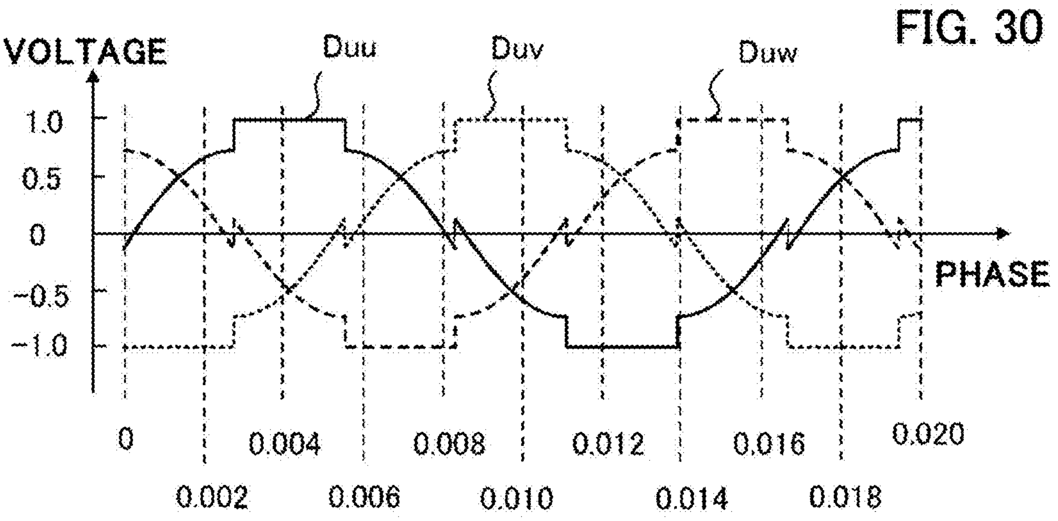
FIG. 30 is a graph showing duty rate signals generated by an inverter control circuit in FIG. 25.

FIG. 24 is a diagram showing a configuration of a power conversion device according to Embodiment 2, and FIG. 25 is a diagram showing a configuration of a control circuit in FIG. 24. FIG. 26 and FIG. 27 are diagrams showing, respectively, configurations of a first example and a second example of a carrier wave generation circuit in FIG. 25. FIG. 28 is a diagram showing another example of the frequency generation circuit in FIG. 26 or FIG. 27. FIG. 29 is a graph showing duty rate signals generated by a converter control circuit in FIG. 25, and FIG. 30 is a graph showing duty rate signals generated by an inverter control circuit in FIG. 25. A power conversion device 100 of Embodiment 2 differs from the power conversion device 100 of Embodiment 1 in that the converter 3 is controlled according to the three-phase modulation method and the inverter 5 is controlled according to the two-phase modulation method. More specifically, the power conversion device 100 of Embodiment 2 differs from the power conversion device 100 of Embodiment 1 in that its control circuit 7 includes a carrier wave generation circuit 24 that outputs the carrier wave Scr2 based on the two-phase modulation method to an inverter control circuit 9 and outputs the carrier wave Scr3 based on the three-phase modulation method to a converter control circuit 8. Description will be made mainly on points different from the power conversion device 100 of Embodiment 1.

The control circuit 7 includes the converter control circuit 8, the inverter control circuit 9, a carrier phase calculation circuit 10 and the carrier wave generation circuit 24. The carrier wave generation circuit 24 generates the carrier wave Scr2 based on the two-phase modulation method and the carrier wave Scr3 based on the three-phase modulation method, on the basis of the carrier phase difference θdef of the carrier ripple currents, the reference frequency fsw0, and an output-side frequency, namely, a driving frequency fm of the electric motor 6. The carrier wave frequency fsw2 of the carrier wave Scr2 based on the two-phase modulation method and a carrier wave frequency fsw3 of the carrier wave Scr3 based on the three-phase modulation method have a predetermined relationship therebetween based on a current flowing into the capacitor 4 or a current flowing out of the capacitor 4, namely, the capacitor current ic. When the relationship between the carrier wave frequency fsw2 and the carrier wave frequency fsw3 satisfies a formula (6) or a formula (7), it is possible, like in the power conversion device 100 of Embodiment 1, to sufficiently suppress the carrier ripple currents flowing into the capacitor 4, as compared with the comparative example as represented by the power conversion system of Patent Document 1 in which the converter and the inverter that are different in modulation method are operated using the carrier waves whose frequencies are the same.

$$fsw2 = 2 \times fsw3 + 3 \times fm \tag{6}$$

$$fsw2 = 2 \times fsw3 - 3 \times fm \tag{7}$$

The method of deriving the formula (6) and the formula (7) is similar to the method of deriving the formula (1) and the Formula (2) in Embodiment 1. It suffices to substitute the frequency fin in Embodiment 1 with the driving frequency fm.

In FIG. 26, the carrier wave generation circuit 24 is shown that corresponds to the case where the carrier wave frequency fsw3 of the converter 3 is set as the reference frequency fsw0 and the carrier wave frequency fsw2 of the inverter 5 satisfies the formula (6). The carrier wave generation circuit 24 shown in FIG. 26 includes a frequency generation circuit 33, a carrier signal generator 21 and a phase delayer 22. The frequency generation circuit 33 generates the carrier wave frequencies fsw2, fsw3 on the basis of the reference frequency fsw0 and the driving frequency fm of the electric motor 6. The carrier signal generator 21 generates the carrier wave Scr3 that is a sawtooth-waveform or triangular-waveform signal whose frequency is the carrier wave frequency fsw3. Further, the carrier signal generator 21 generates a carrier wave Scr2*p* prior to the phase adjustment that is a sawtooth-waveform or triangle-waveform signal with the carrier wave frequency fsw2. The phase delayer 22 imparts the carrier phase difference θdef to the carrier wave Scr2*p* prior to the phase adjustment to thereby generate the carrier wave Scr2 after the phase adjustment. The frequency generation circuit 33 shown in FIG. 26 is the same as the frequency generation circuit 33 shown in FIG. 9 except that the driving frequency fm is inputted thereto.

In FIG. 27, the carrier wave generation circuit 24 is shown that corresponds to the case where the carrier wave frequency fsw3 of the converter 3 is set as the reference frequency fsw0 and the carrier wave frequency fsw2 of the inverter 5 satisfies the formula (7). The carrier wave generation circuit 24 shown in FIG. 27 differs in the circuit configuration of the frequency generation circuit 33, from the carrier wave generation circuit 24 shown in FIG. 26. Description will be made mainly on points different from the carrier wave generation circuit 24 shown in FIG. 26. The frequency generation circuit 33 shown in FIG. 27 includes calculators 58*a*, 58*b* and 58*d*. The frequency generation circuit 33 shown in FIG. 27 is the same as the frequency generation circuit 33 shown in FIG. 10 except that the driving frequency fm is inputted thereto.

As previously described in Embodiment 1, the reference frequency fsw0 may be different from the carrier wave frequency fsw3. Another frequency generation circuit 33 shown in FIG. 28 differs from the frequency generation circuits 33 shown in FIG. 26 and FIG. 27 in that a calculator 58*e* is additionally provided on the input side of the calculator 58*a*. The calculator 58*e*, after a frequency "fsw3–fs" is inputted thereto as the reference frequency fsw0, adds the frequency fs to the thus-inputted reference frequency fsw0, to thereby generate the carrier wave frequency fsw3. Note that the other frequency generation circuit 33 shown in FIG. 28 is a circuit corresponding to the formula (6). In another circuit corresponding to the formula (7), like in FIG. 27, the output value of the calculator 58*b* at an input of the calculator 58*c* will be subtracted. Namely, the input of the calculator 58*c* on the output side of the calculator 58*b* shall be indicated instead by "−". The other frequency generation circuit 33 in this case shall be referred to as a subtraction type circuit. The formula (6) and the formula (7) each show a relationship between the carrier wave frequency fsw2 and the carrier wave frequency fsw3 and accordingly, the carrier wave generation circuit 24 that includes one of the frequency generation circuit 33 shown in FIG. 28 and the subtraction type circuit, can also generate, like the carrier wave generation circuits 24 of FIG. 26 and FIG. 27, the carrier wave frequencies fsw2 and fsw3 that satisfies the formula (6) or the formula (7).

With respect to the converter control circuit 8 in the control circuit 7, since the carrier wave Scr3 based on the three-phase modulation method is inputted, its d-q reverse converter 14 generates duty rate signals Dur, Dus, Dut based on the three-phase modulation method and shown in FIG. 29. Note that the duty rate signals Dur, Dus, Dut are not limited to sinusoidal signals, and may be third-order superimposed-wave signals shown in FIG. 15. Its carrier comparator 15 compares the duty rate signals Dur, Dus, Dur with the carrier wave Scr3 based on the three-phase modulation method and inputted from a carrier-wave input terminal 37, to thereby generate digital control signals s3*p* for performing PWM control. Its gate drive circuit 35 generates analog control signals s3 from the digital control signals s3*p*.

With respect to the inverter control circuit 9 in the control circuit 7, since the carrier wave Scr2 based on the two-phase modulation method is inputted, its d-q reverse converter 17 generates duty rate signals Duu, Duv, Duw based on the two-phase modulation method and shown in FIG. 30. Note that the duty rate signals Duu, Duv, Duw are not limited to so-called "top/bottom attach signals", and may be so-called "bottom attach signals" or so-called "top attach signals" shown in FIG. 12 or FIG. 13. Its carrier comparator 18 compares the duty rate signals Duu, Duv, Duw with the carrier wave Scr2 based on the two-phase modulation method and inputted from a carrier-wave input terminal 38, to thereby generate digital control signals s5*p* for performing PWM control. Its gate drive circuit 36 generates analog control signals s5 from the digital control signals s5*p*. The inverter control circuit 9 generates the control signals s5 that are different in modulation method from the control signals s3 and that controls a plurality of switching elements Q5*a* to Q5*f* in the inverter 5, on the basis of the carrier signal Scr2 based on the two-phase modulation method and having a frequency and a phase that are different from those of the carrier signal Scr3 based on the three-phase modulation method.

According to the power conversion device 100 of Embodiment 2, since the converter 3 is driven using the control signals s3 generated in such a manner that the carrier wave Scr3 is inputted to the converter control circuit 8, and the inverter 5 is driven using the control signals s5 generated in such a manner that the carrier wave Scr2 is inputted to the inverter control circuit 9, it is possible, like in the power conversion device 100 of Embodiment 1, to sufficiently suppress the carrier ripple currents flowing into the capacitor 4, as compared with the comparative example as represented by the power conversion system of Patent Document 1 in which the converter and the inverter that are different in modulation method are operated using the carrier waves whose frequencies are the same.

As described above, the power conversion device 100 of Embodiment 2 supplies to a load (electric motor 6), the second AC power converted from the first AC power inputted from the AC power source 1. The power conversion device 100 includes the converter 3 that converts the first AC power inputted from the AC power source 1 to DC power: the inverter 5 that converts the DC power outputted from the converter 3 to the second AC power: the capacitor 4 that is connected between the high-potential side line 45*p* and the low-potential side line 45*n* through which the DC power is transferred; and the control circuit 7 that controls the converter 3 and the inverter 5. The control circuit 7 includes: the converter control circuit 8 that generates first control signals (control signals s3) that control a plurality of switching elements Q3*a*, Q3*b*, Q3*c*, Q3*d*, Q3*e*, Q3*f* in the converter 3, on the basis of a first carrier wave (carrier wave Scr3); the inverter control circuit 9 that generates second control signals (control signals s5) that are different in modulation method from the first control signals (control signals s3) and that control a plurality of switching elements Q5*a*, Q5*b*, Q5*c*, Q5*d*, Q5*e*, Q5*f* in the inverter 5, on the basis of a second carrier wave (carrier wave Scr2) having a frequency and a phase that are different from those of the first carrier wave (carrier wave Scr3); and the carrier wave generation circuit 24 that generates the first carrier wave (carrier wave Scr3) and the second carrier wave (carrier wave Scr2). The frequency (carrier wave frequency fsw3) of the first carrier wave (carrier wave Scr3) and the frequency (carrier wave frequency fsw2) of the second carrier wave (carrier wave Scr2) have a predetermined relationship therebetween based on the current flowing into the capacitor 4 or the current flowing out of the capacitor 4. According to the power conversion device 100 of Embodiment 2, because of that configuration, the converter 3 and the inverter 5 are controlled using, respectively, the first control signals (control signals s3) and the second control signals (control signals s5) that are different in modulation method, frequency and phase from each other and the respective frequencies of which have the predetermined relation-ship therebetween, so that the carrier ripple currents flowing into the capacitor 4 can be reduced efficiently.

Embodiment 3

Figure 31:
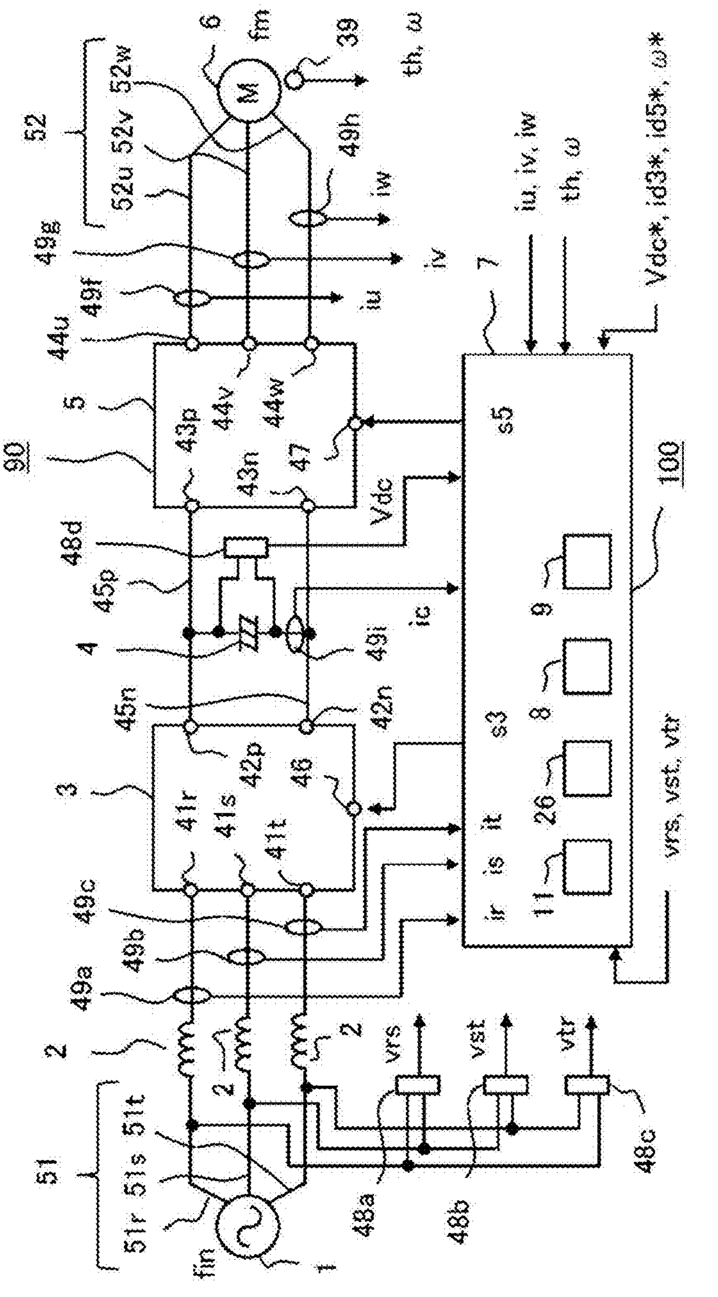
FIG. 31 is a diagram showing a configuration of a power conversion device according to Embodiment 3.
Figure 32:
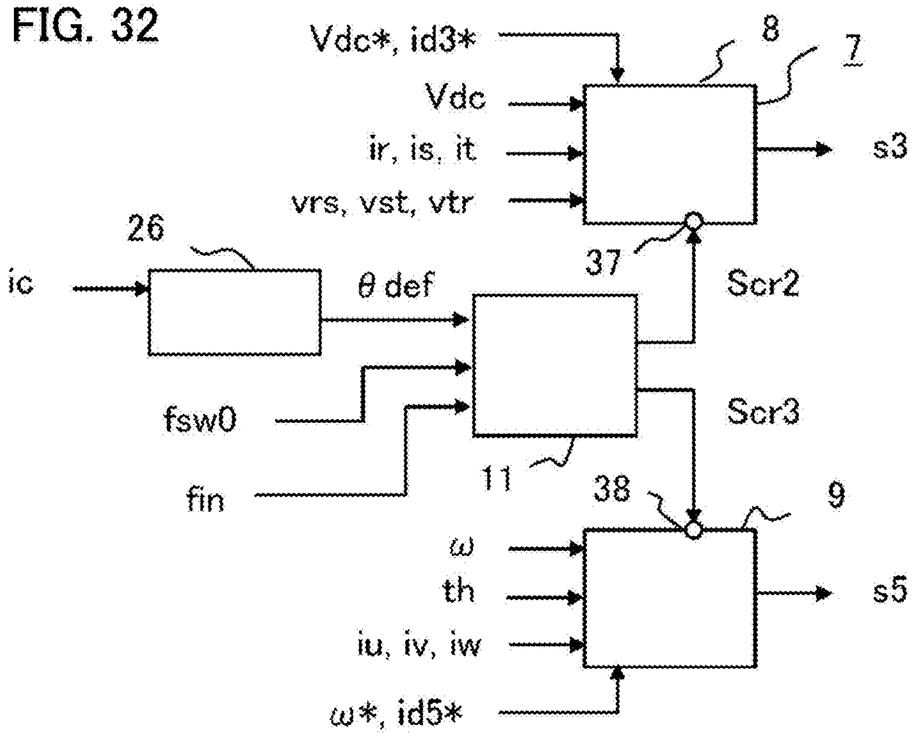
FIG. 32 is a diagram showing a configuration of a control circuit in FIG. 31.
Figure 33:
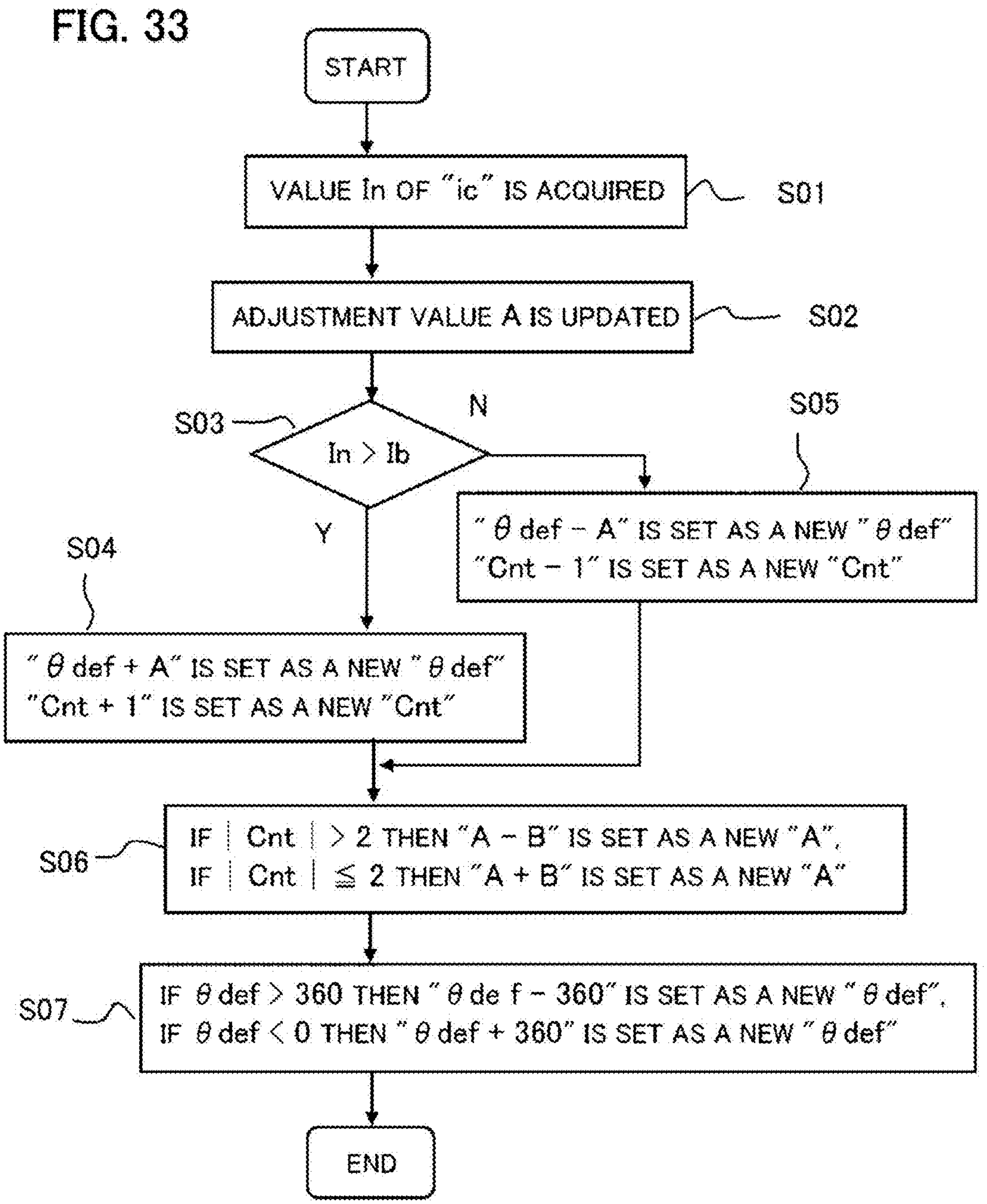
FIG. 33 is a flowchart showing operations of a carrier phase calculation circuit in FIG. 32.

FIG. 31 is a diagram showing a configuration of a power conversion device according to Embodiment 3, and FIG. 32 is a diagram showing a configuration of a control circuit in FIG. 31. FIG. 33 is a flowchart showing operations of a carrier phase calculation circuit in FIG. 32. A power conversion device 100 of Embodiment 3 differs from the power conversion device 100 of Embodiment 1 in that its control circuit 7 includes a carrier phase calculation circuit 26 that calculates the carrier phase difference θdef on the basis of the capacitor current ic detected by a current detector 49*i*. Description will be made mainly on points different from the power conversion device 100 of Embodiment 1.

The power conversion device 100 of Embodiment 3 includes the current detector 49*i* instead of the current detectors 49*d*, 49*e* in the power conversion device 100 of Embodiment 1. The control circuit 7 in Embodiment 3 includes the carrier phase calculation circuit 26 instead of the carrier phase calculation circuit 10 in the control circuit 7 in Embodiment 1. Operations of the carrier phase calculation circuit 26 will be described using FIG. 32 and FIG. 33. In FIG. 33, a case is shown where the unit of the carrier phase difference θdef is degree. When the unit of the carrier phase difference θdef is radian, the numeral "360" in Step S07 shall be read as 2π.

The carrier phase calculation circuit 26 calculates the carrier phase difference θdef that is a phase difference between the first carrier wave used for generating the control signals s3 of the converter 3 and the second carrier wave used for generating the control signals s5 of the inverter 5, and at which the capacitor current ic that is a current flowing into the capacitor 4 or a current flowing out of the capacitor 4 is minimized. More specifically, with respect to the capacitor current ic, the carrier phase calculation circuit 26 compares a current detection value In detected every fixed period of time with the previous current detection value Ib to thereby calculate the carrier phase difference θdef by using adjustment values A, B so that the capacitor current ic is minimized.

In Step S01, with respect to the capacitor current ic, the current detection value In detected every fixed period of time is acquired (a current value acquisition step). In Step S02, the adjustment value A is updated (an adjustment value update step). The adjustment value A is an adjustment value for adjusting the last-calculated carrier phase difference θdef. As the adjustment value A for the first time, an initial value of the adjustment value A is used. In Step S03, the current detection value In and the previous current detection value Ib are compared with each other and then, if the current detection value In is larger than the current detection value Ib, the flow moves to Step S04, and if the current detection value In is not larger than the current detection value Ib, the flow moves to Step S05 (a current value comparison step). As the current detection value Ib for the first time, for example, the value 0 (zero) is used. In this case, in Step S03 for the first time, the current detection value In is determined to be larger than the current detection value Ib, so that the flow moves to Step S04. In Step 04, the adjustment value A is added to the previous carrier phase difference θdef, and the resultant value is set as a new carrier phase difference θdef. A variable Cnt is incremented by 1, and the resultant value is set as a new variable Cnt. As the carrier phase difference θdef for the first time, an initial value θdef0 is used, and as the variable Cnt for the first time, the value 0 (zero) is used. The initial value θdef0 is, for example, 0 (zero).

In Step S05, the adjustment value A is subtracted from the previous carrier phase difference θdef, and the resultant value is set as a new carrier phase difference θdef. The variable Cnt is decremented by 1, and the resultant value is set as a new variable Cnt. As the carrier phase difference θdef for the first time, the initial value θdef0 is used, and as the variable Cnt for the first time, the value 0 (zero) is used. The initial value θdef0 is, for example, 0 (zero). Step S04 and Step S05 are each a phase difference change step. In Step S06, if the absolute value of the variable Cnt is larger than 2, the adjustment value B is subtracted from the adjustment value A and the resultant value is set as a new adjustment value A. If the absolute value of the variable Cnt is equal to or less than 2, the adjustment value B is added to the adjustment value A and the resultant value is set as a new adjustment value A. Step S06 is a next-adjustment-value setting step.

After Step S06, in Step S07, if the carrier phase difference θdef is larger than 360 degrees, 360 degrees are subtracted from the carrier phase difference θdef, and the resultant value is set as a new carrier phase difference θdef. If the carrier phase difference θdef is smaller than 0 degree, 360 degrees are added to the carrier phase difference θdef, and the resultant value is set as a new carrier phase difference θdef. Step S07 is a phase difference setting step, and the difference is calculated to have a value within 360 degrees. After the execution of Step S07, the flow about the carrier phase difference θdef for the first time, is terminated. For the second and subsequent times, by use of the adjustment value A and the carrier phase difference θdef that have been set by the previous Steps S04 to S07, a new carrier phase difference θdef will be calculated.

When the current detector **49*i* outputs its detection value every fixed period of time, Step S01 to Step S07 are executed at every time the current detector 49*i* outputs the detection value. When the current detector 49*i* outputs its detection value in a shorter time than the execution time of Step S04 to Step S07, Step SOI is executed after the execution of Step S07**.

The carrier phase calculation circuit 26 adjusts the carrier phase difference θdef by using a large amount of change when the capacitor current ic of the capacitor 4 is away from its minimum value, and adjusts the carrier phase difference θdef by using a small amount of change when the capacitor current ic of the capacitor 4 is near the minimum value. Thus, according to the power conversion device 100 of Embodiment 3, the converter 3 and the inverter 5 are controlled so that the capacitor current ic of the capacitor 4 becomes smaller and thus, the capacitor current ic can be minimized finally.

The adjustment value A is a phase adjustment value, and the adjustment value B corresponds to a change value for fine adjustment about the phase adjustment value. The adjustment values A, B may each be any given number of degrees. However, when the adjustment values A, B are set to small values, although the accuracy of adjustment increases due to fine adjustment, it takes time for adjustment. Meanwhile, when the adjustment values A, B are set to large values, although the accuracy of adjustment decreases, the capacitor current ic can be reduced in a short time.

According to the power conversion device 100 of Embodiment 3, since the converter 3 and the inverter 5 are controlled, like in the power conversion device 100 of Embodiment 1, by the control signals s3 and the control signals s5 that are different in modulation method, frequency and phase from each other and the respective frequencies of which have the predetermined relationship therebetween, an effect is achieved that is similar to that by the power conversion device 100 of Embodiment 1. Furthermore, since the number of the current detectors can be reduced as compared with the power conversion device 100 of Embodiment 1, the power conversion device 100 of Embodiment 3 can be configured at a lower cost.

Embodiment 4

Figure 34:
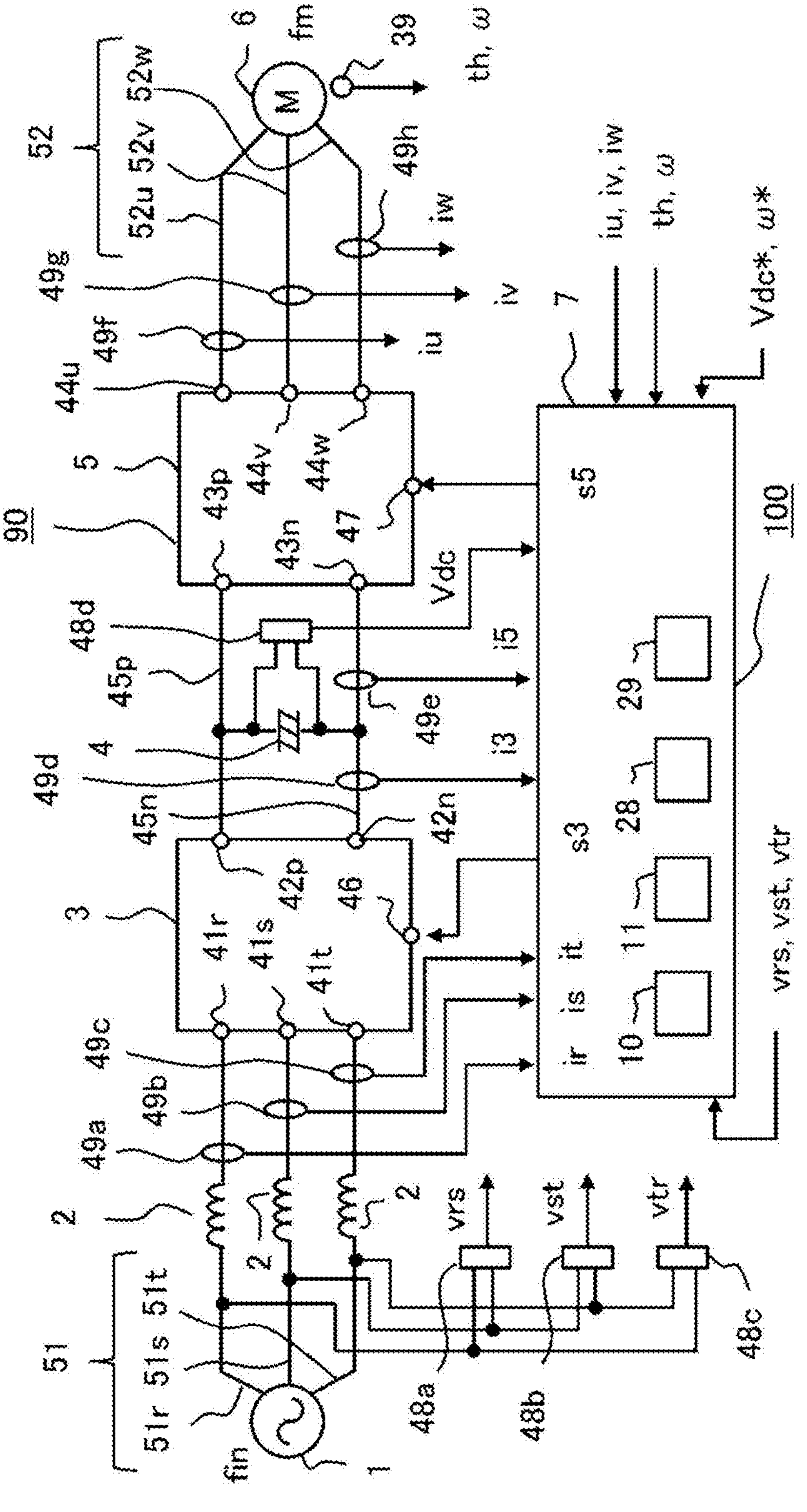
FIG. 34 is a diagram showing a configuration of a power conversion device according to Embodiment 4.
Figure 35:
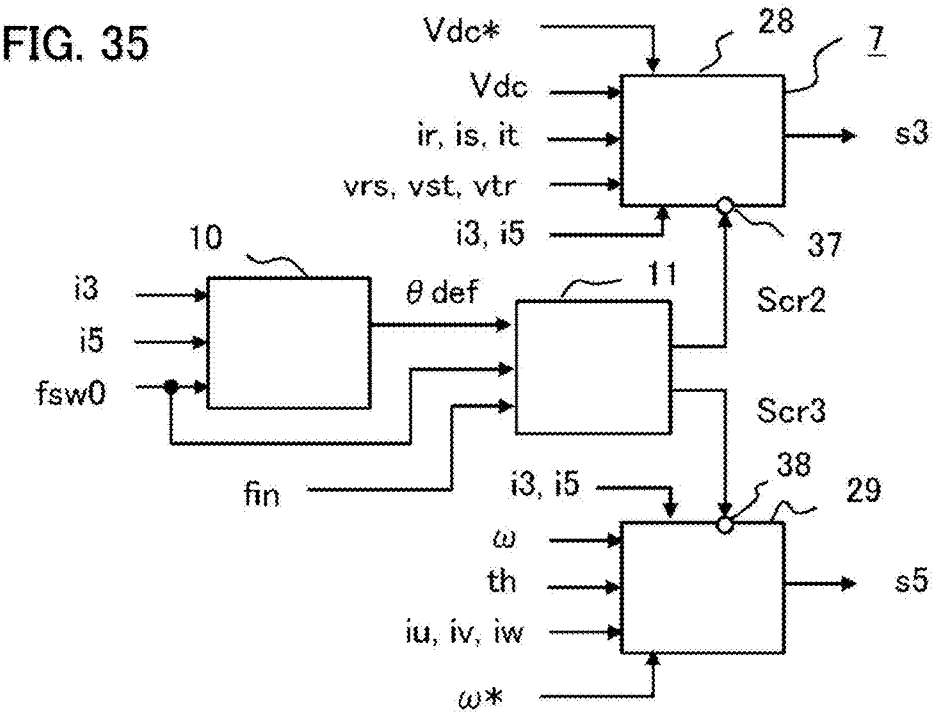
FIG. 35 is a diagram showing a configuration of a control circuit in FIG. 34.
Figure 36:
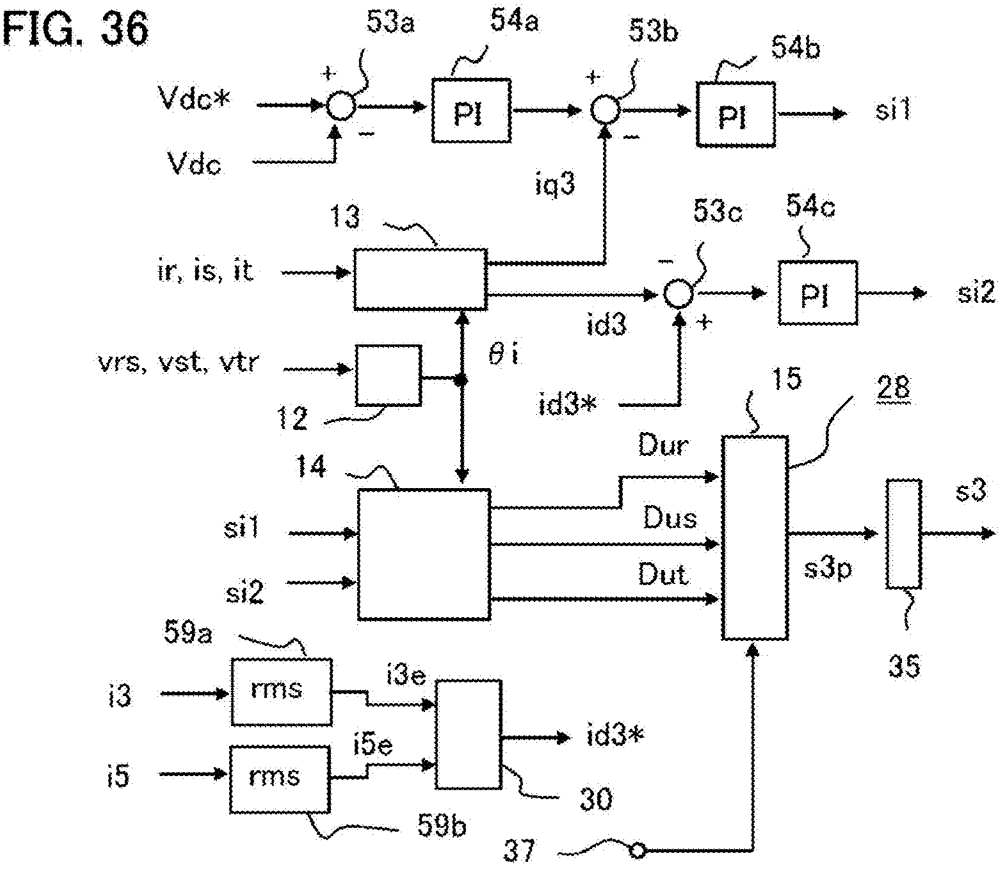
FIG. 36 is a diagram showing a configuration of a converter control circuit in FIG. 34.

FIG. 34 is a diagram showing a configuration of a power conversion device according to Embodiment 4, and FIG. 35 is a diagram showing a configuration of a control circuit in FIG. 34. FIG. 36 is a diagram showing a configuration of a converter control circuit in FIG. 34, and FIG. 37 is a diagram showing a configuration of an inverter control circuit in FIG. 34. FIG. 38 is a graph showing frequency components in a capacitor current of the power conversion device according to Embodiment 4. A power conversion device 100 of Embodiment 4 differs from the power conversion device 100 of Embodiment 1 in that its control circuit 7 includes, instead of the converter control circuit 8 and the inverter control circuit 9, a converter control circuit 28 and an inverter control circuit 29 that generate control signals s3 and control signals s5, respectively, through generation of d-axis current command values id3* and id5* from the output current i3 and the input current 15 detected by the current detectors 49*d*, 49*e*. Description will be made mainly on points different from the power conversion device 100 of Embodiment 1.

The converter control circuit 28 results from adding to the converter control circuit 8 of FIG. 5, an effective value calculator 59*a* that calculates a current effective value i3*e* that is the effective value of the output current i3 as a current on the side of the converter 3: an effective value calculator 59*b* that calculates a current effective value i5*e* that is the effective value of the input current i5 as a current on the side of the inverter 5; and a reactive current calculator 30 that calculates the d-axis current command value id3* from the current effective values i3*e*, i5*e*. The inverter control circuit 29 results from adding to the inverter control circuit 9 of FIG. 6, an effective value calculator 59*c* that calculates the current effective value i3*e* that is the effective value of the output current i3 as a current on the side of the converter 3; an effective value calculator 59*d* that calculates the current effective value i5*e* that is the effective value of the input current i5 as a current on the side of the inverter 5; and a reactive current calculator 31 that calculates the d-axis current command value id5* from the current effective values i3*e*, i5*e*.

The reactive current calculator 30 compares the current effective value i5*e* that is the effective value of the current on the side of the inverter 5, with the current effective value i3*e* that is the effective value of the current on the side of the converter 3, and then, if the current effective value i5*e* is larger than the current effective value i3*e*, generates a first reactive-current command value depending on the difference between the current effective value i5*e* and the current effective value i3*e*, that is, the d-axis current command value id3* Since the converter control circuit 28 generates the control signals s3 by using the d-axis current command value id3* generated by the reactive current calculator 30, the current amount of the output current i3 increases and thus, it is possible to reduce a carrier ripple current flowing into the capacitor 4 that may be generated when the input current i5 on the side of the inverter 5 is larger than the output current i3.

The reactive current calculator 31 compares the current effective value i5*e* that is the effective value of the current on the side of the inverter 5, with the current effective value i3*e* that is the effective value of the current on the side of the converter 3, and then, if the current effective value i3*e* is larger than the current effective value i5*e*, namely, the current effective value i5*e* is smaller than the current effective value i3*e*, generates a second reactive-current command value depending on the difference between the current effective value i5*e* and the current effective value i3*e*, that is, the d-axis current command value id5*. Since the inverter control circuit 29 generates the control signals s5 by using the d-axis current command value id5* generated by the reactive current calculator 31, the current amount of the input current i5 increases and thus, it is possible to reduce a carrier ripple current flowing into the capacitor 4 that may be generated when the output current i3 on the side of the converter 3 is larger than the input current i5.

In FIG. 38, an FFT result at the time the d-axis current command value id3* with respect to the output current i3 was increased by the converter control circuit 28 is shown. In FIG. 38, the ordinate represents a current [Arms], and the abscissa represents a frequency [KHz]. The effective value about the capacitor current ic of the capacitor 4 in the power conversion device 100 of Embodiment 4 was 4.42 [Arms]. As described previously, the effective value about the capacitor current ic of the capacitor 4 in the power conversion device 100 of Embodiment 1 including the converter control circuit 8 and the inverter control circuit 9 was 4.68 [Arms]. The power conversion device 100 of Embodiment 4 can reduce the carrier ripple currents flowing into the capacitor 4, more significantly than the power conversion device 100 of Embodiment 1. Note that, also when the d-axis current command value id5* with respect to the input current i5 is increased by the inverter control circuit 29, it is possible to reduce the carrier ripple currents flowing into the capacitor 4, more significantly than the power conversion device 100 of Embodiment 1. However, when the reactive current command value, namely, the d-axis current command value id3* or id5* is increased beyond necessity, the current value itself becomes larger and thus, it is necessary to restrict the command value to be an adequate value.

According to the power conversion device 100 of Embodiment 4, since the converter 3 and the inverter 5 are controlled, like in the power conversion device 100 of Embodiment 1, by the control signals s3 and the control signals s5 that are different in modulation method, frequency and phase from each other and the respective frequencies of which have the predetermined relationship therebetween, an effect is achieved that is similar to that by the power conversion device 100 of Embodiment 1. Furthermore, according to the power conversion device 100 of Embodiment 4, the control signals s3, s5 are generated in such a manner that the reactive current command value, namely, the d-axis current command value id3* or the d-axis current command value id5* is increased so that the smaller one of the current (output current i3) on the side of the converter 3 and the current (input current i5) on the side of the inverter 5, becomes larger, it is possible to reduce the carrier ripple currents flowing into the capacitor 4, more significantly than the power conversion device 100 of Embodiment 1.

In the foregoing description, a case has been described where the converter control circuit 28 and the inverter control circuit 29 in Embodiment 4 are applied to the power conversion device 100 of Embodiment 1. The converter control circuit 28 and the inverter control circuit 29 in Embodiment 4 may also be applied to the power conversion device 100 of Embodiment 2 or the power conversion device 100 of Embodiment 3.

Embodiment 5

Figure 39:
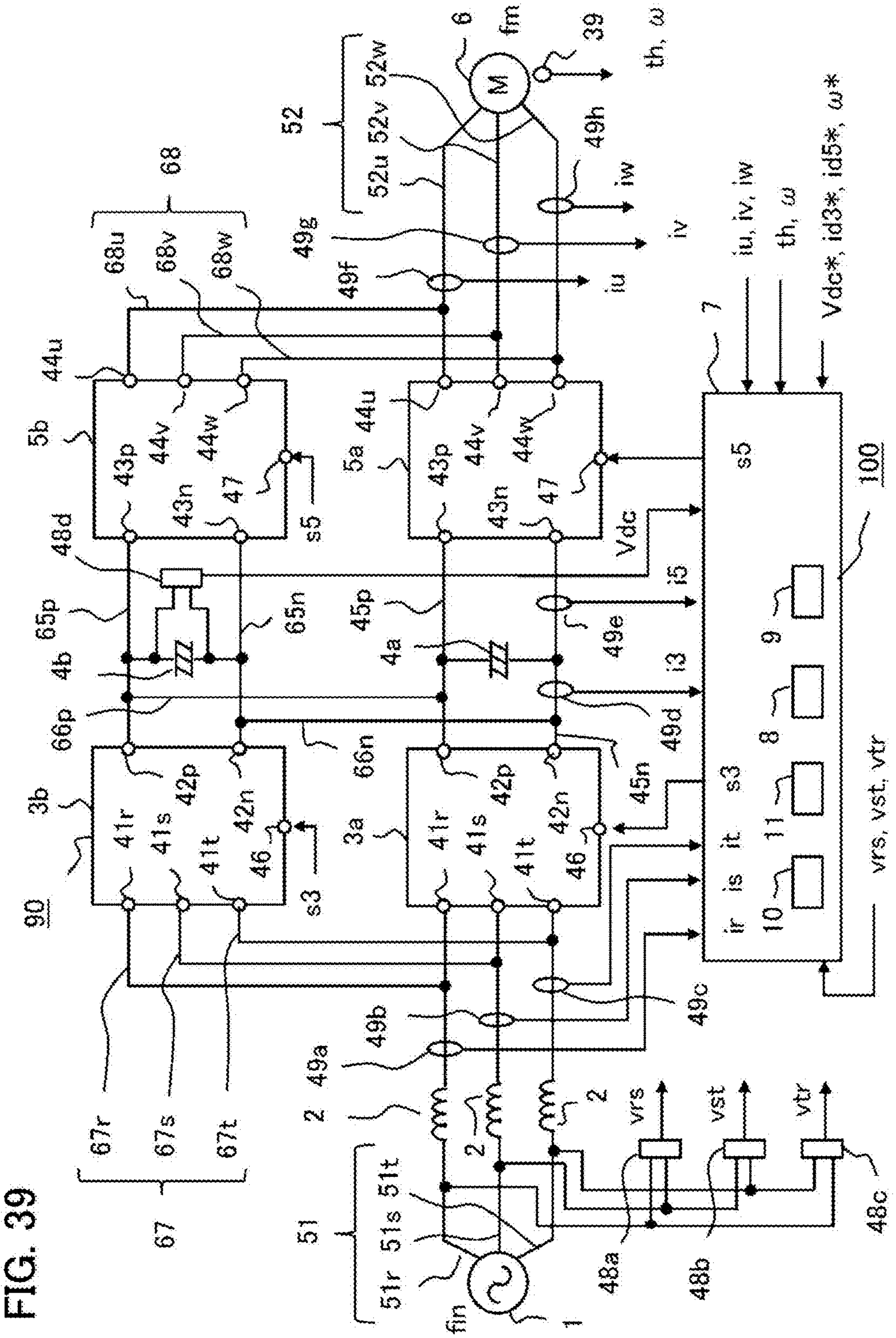
FIG. 39 is a diagram showing a configuration of a power conversion device according to Embodiment 5.
Figure 40:
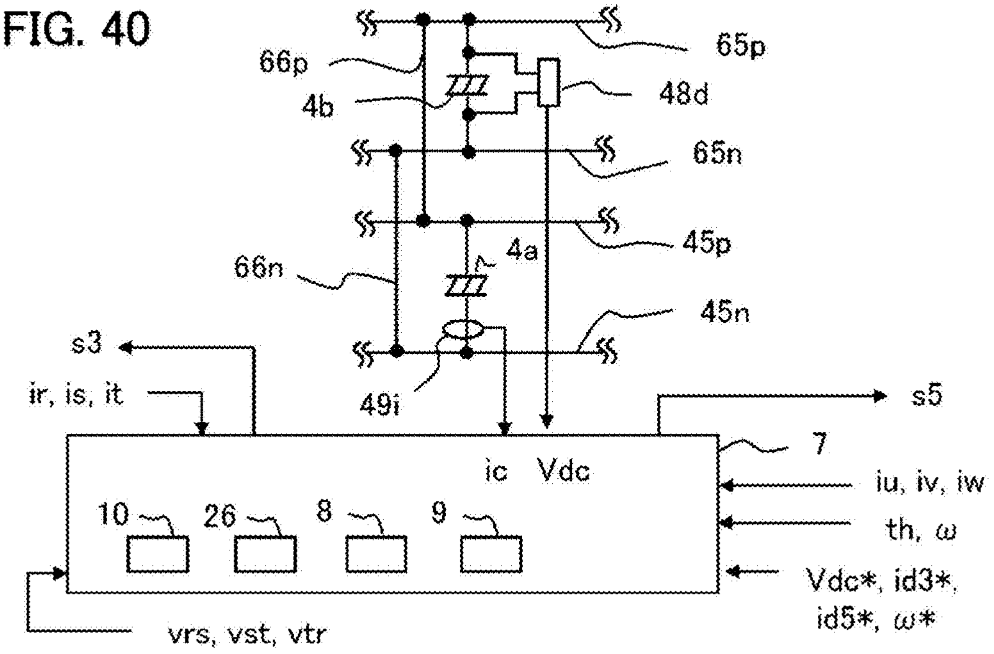
FIG. 40 is a diagram showing a configuration of another power conversion device according to Embodiment 5.

FIG. 39 is a diagram showing a configuration of a power conversion device according to Embodiment 5, and FIG. 40 is a diagram showing a configuration of another power conversion device according to Embodiment 5. A power conversion device 100 of Embodiment 5 differs from the power conversion device 100 of Embodiment 1 in that, in its main circuit 90, two sets of converters 3 and inverters 5 are provided and these two sets are configured in parallel to each other. Description will be made mainly on points different from the power conversion device 100 of Embodiment 1.

According to the power conversion device 100 of Embodiment 5 shown in FIG. 39, the converter 3, the inverter 5 and the capacitor 4 in the power conversion device 100 of Embodiment 1 shown in FIG. 1, are substituted with a converter 3*a*, an inverter 5*a* and a capacitor 4*a*, respectively, and there are further provided: a converter 3*b*; an inverter 5*b*; a high-potential side line 65*p* and a low-potential side line 65*n* through which DC power outputted from the converter 3*b* is transferred; a capacitor 4*b* connected between the high-potential side line 65*p* and the low-potential side line 65*n*; a three-phase power line 67 connected to the three-phase power line 51; a three-phase power line 68 connected to the three-phase power line 52; a connection line 66*p* that connects the high-potential side line 45*p* and the high-potential side line 65*p* to each other; and a connection line 66*n* that connects the low-potential side line 45*n* and the low-potential side line 65*n* to each other. The three-phase power line 67 includes an r-phase power line 67*r*, an s-phase power line 67*s* and a t-phase power line 67*t*. The three-phase power line 68 includes a u-phase power line 68*u*, a v-phase power line 68*v* and a w-phase power line 68*w*. The r-phase, s-phase and t-phase of the power line 67 are connected to the corresponding r-phase, s-phase and t-phase of the power line 51. The u-phase, v-phase and w-phase of the power line 68 are connected to the corresponding u-phase, v-phase and w-phase of the power line 52.

The control signals s3 are inputted to control terminals 46 of the converter 3*a* and to control terminals 46 of the converter 3*b*, and the control signals 5*s* are inputted to control terminals 47 of the inverter 5*a* and to control terminals 47 of the inverter 5*b*. In FIG. 39, a case is shown where a voltage detector 48*d* detects the DC voltage Vdc across the capacitor 4*b*, and the current detectors 49*d*, 49*e* detect the output current i3 of the converter 3*a* and the input current i5 of the inverter 5*a* with respect to the capacitor 4*a*. Note that the voltage detector 48*d* may detect the DC voltage Vdc across the capacitor 4*a*, and the current detectors 49*d*, 49*e* may detect the output current i3 of the converter 3*b* and the input current 15 of the inverter 5*b* with respect to the capacitor 4*b*.

It is noted that, with respect to the input voltages inputted from the three-phase AC power source 1, namely, line voltages in the power line 51: the output currents of the three-phase AC power source 1, namely, phase currents in the power line 51; and input currents inputted to the electric motor 6, namely, phase currents in the power line 52; it is not necessary to detect all of these three-phase voltages/currents, and it is allowed to detect two of them and then to calculate the voltage/current corresponding to the remaining third phase in the control circuit 7. In that case, although the stability in control is lowered, it is possible to decrease the number of the detectors.

As a control circuit 7, the control circuit 7 in Embodiments 1 to 4 may be employed. Note that, in the case where the control circuit 7 in Embodiment 3 is employed, as shown, for example, in FIG. 40, a current detector 49*i* that detects the capacitor current ic of the capacitor 4*a* or the capacitor 4*b* is provided instead of the current detectors 49*d*, 49*e*, and the capacitor current ic is inputted to the control circuit 7. Note that, in FIG. 40, the current detector 49*i* that detects the capacitor current ic of the capacitor 4*a* is shown.

The power conversion device 100 of Embodiment 5 corresponds to a power conversion device that is the power conversion device 100 in Embodiments 1 to 4, the main circuit 90 of which is, however, configured to have two circuits arranged in parallel. The power conversion device 100 of Embodiment 5 places the converter 3*a* and the converter 3*b* under same control, and places the inverter 5*a* and the inverter 5*b* under same control. Thus, the operations of the power conversion device 100 of Embodiment 5 are the same as those of the power conversion device of one of Embodiments 1 to 4, depending on the configuration applied to the control circuit 7. Accordingly, the power conversion device 100 of Embodiment 5 achieves an effect that is similar to that by the power conversion device 100 of one of Embodiments 1 to 4, depending on the configuration applied to the control circuit 7. Although the power conversion device 100 of Embodiment 5 includes the parallelly-connected converters and the parallelly-connected inverters, it can reduce the capacitor current ic that is a current inputted to, and outputted from the capacitor located in the middle stage between the converter and the inverter, to thereby suppress the heat generation of the capacitor. This makes it possible to use the capacitor that is smaller than that of the comparative example power conversion device described previously.

In FIG. 39, the converters, the inverters and the capacitors are arranged in parallel; however, even with a configuration in which the switching elements in the converters and the switching elements in the inverters, namely, the respective legs of each phase are arranged in parallel, an effect similar to the above is achieved. Furthermore, the parallelly-arranged number is not limited to two, and even when the parallelly-arranged number is more than that number, an effect similar to the above is achieved.

Figure 41:
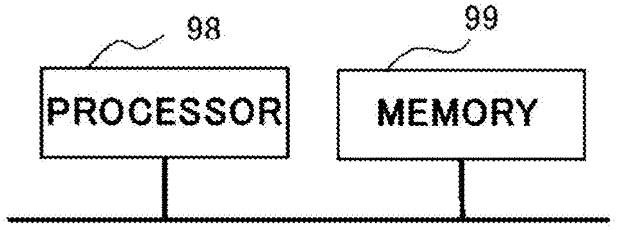
FIG. 41 is a diagram showing another example of a hardware configuration that implements functions of each said control circuit.

It is noted that the functions of following target circuits that are included in the control circuit 7, may be implemented by a processor 98 and a memory 99 shown in FIG. 41. The target circuits are: the converter control circuit 8 except for the gate drive circuit 35; the inverter control circuit 9 except for the gate drive circuit 36; the carrier phase calculation circuit 10; the carrier wave generation circuit 11: the carrier wave generation circuit 24; the carrier phase calculation circuit 26; the converter control circuit 28 except for the gate drive circuit 35; and the inverter control circuit 29 except for the gate drive circuit 36. FIG. 41 is a diagram showing another example of a hardware configuration that implements the functions of the control circuit. In this case, the target circuits are implemented in such a manner that the processor 98 executes programs stored in the memory 99. Instead, multiple processors 98 and multiple memories 99 may implement the respective functions in their cooperative manner.

In this application, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed in the description of this application. For example, such cases shall be included where at least one configuration element is modified; where at least one configuration element is added or omitted; and furthermore, where at least one configuration element is extracted and combined with a configuration element of another embodiment.

DESCRIPTION OF REFERENCE NUMERALS AND SIGNS

1: AC power source, 3, 3*a*, 3*b*: converter, 4, 4*a*, 4*b*: capacitor, 5, 5*a*, 5*b*: inverter, 6: electric motor (load), 7: control circuit, 8: converter control circuit, 9: inverter control circuit, 10: carrier phase calculation circuit, 11: carrier wave generation circuit, 19, 19*a*, 19*b*: phase detector, 20: phase difference calculator, 28: converter control circuit, 29: inverter control circuit, 30: reactive current calculator, 31: reactive current calculator, 45*p*: high-potential side line, 45*n*: low-potential side line, 65*p*: high-potential side line, 65*n*: low-potential side line, 100: power conversion device, fin: frequency, fm: driving frequency, fsw0: reference frequency, fsw2: carrier wave frequency, fsw3: carrier wave frequency, i3: output current, i3*e*: current effective value, i5: input current, i5*e*: current effective value, ic: capacitor current, id3*: d-axis current command value, id5*: d-axis current command value, Q3*a*, Q3*b*, Q3*c*, Q3*d*, Q3*e*, Q3*f*: switching element, Q5*a*, Q5*b*, Q5*c*, Q5*d*, Q5*e*, Q5*f*: switching element, s3, s3*a*, s3*b*, s3*c*, s3*d*, s3*e*, s3*f*: control signal, s5, s5*a*, s5*b*, s5*c*, s5*d*, s5*e*, s5*f*: control signal, Scr2: carrier wave, Scr3: carrier wave, θ3*s*: phase, θ5*s*: phase, θdef: carrier phase difference.

The invention claimed is:

1. A power conversion device which supplies to a load, second AC power converted from first AC power inputted from an AC power source, said power conversion device comprising:

a converter that converts the first AC power inputted from the AC power source to DC power;

an inverter that converts the DC power outputted from the converter to the second AC power;

a capacitor that is connected between a high-potential side line and a low-potential side line through which the DC power is transferred; and a control circuit that controls the converter and the inverter;

wherein the control circuit comprises:

a converter control circuit that generates first control signals that control a plurality of switching elements in the converter, on a basis of a first carrier wave;

an inverter control circuit that generates second control signals that are different in modulation method from the first control signals and that control a plurality of switching elements in the inverter, on a basis of a second carrier wave having a frequency and a phase that are different from those of the first carrier wave; and a carrier wave generation circuit that generates the first carrier wave and the second carrier wave; and wherein the frequency of the first carrier wave and the frequency of the second carrier wave have a predetermined relationship therebetween based on a current flowing into the capacitor or a current flowing out of the capacitor.

2. The power conversion device as set forth in claim 1, comprising a carrier phase calculation circuit that calculates a phase difference between the first carrier wave and the second carrier wave, wherein the carrier phase calculation circuit calculates a carrier phase difference that is the phase difference between the first carrier wave and the second carrier wave, on a basis of: a current on a side of the converter and a current on a side of the inverter in the high-potential side line or the low-potential side line to which one of ends of the capacitor is connected; and a predetermined reference frequency.

3. The power conversion device as set forth in claim 2, wherein the carrier phase calculation circuit includes: a first phase detector that detects a first phase that is a phase of a component corresponding to the reference frequency in the current on the side of the converter; and a second phase detector that detects a second phase that is a phase of a component corresponding to the reference frequency in the current on the side of the inverter; and a phase difference calculator that calculates a difference between the first phase and the second phase.

4. The power conversion device as set forth in claim 1, comprising a carrier phase calculation circuit that calculates a phase difference between the first carrier wave and the second carrier wave, wherein the carrier phase calculation circuit calculates a carrier phase difference that is the phase difference between the first carrier wave and the second carrier wave and at which the current flowing into the capacitor or the current flowing out of the capacitor is minimized.

5. The power conversion device as set forth in claim 1, wherein the converter control circuit generates the first control signals that are based on a two-phase modulation method, and wherein the inverter control circuit generates the second control signals that are based on a three-phase modulation method.

6. The power conversion device as set forth in claim 4, wherein the converter control circuit generates the first control signals that are based on a two-phase modulation method, and wherein the inverter control circuit generates the second control signals that are based on a three-phase modulation method.

7. The power conversion device as set forth in claim 1, wherein the converter control circuit generates the first control signals that are based on a three-phase modulation method, and wherein the inverter control circuit generates the second control signals that are based on a two-phase modulation method.

8. The power conversion device as set forth in claim 4, wherein the converter control circuit generates the first control signals that are based on a three-phase modulation method, and wherein the inverter control circuit generates the second control signals that are based on a two-phase modulation method.

9. The power conversion device as set forth in claim 5, wherein, when the frequency of the first carrier wave with respect to the first control signals based on the two-phase modulation method is defined as "fsw2", the frequency of the second carrier wave with respect to the second control signals based on the three-phase modulation method is defined as "fsw3", and a frequency of the AC power source is defined as "fin", the carrier wave generation circuit generates the first carrier wave and the second carrier wave whose frequency fsw2 and frequency fsw3 have a relationship represented by "$fsw2=2\times fsw3\pm 3\times fin$".

10. The power conversion device as set forth in claim 6, wherein, when the frequency of the first carrier wave with respect to the first control signals based on the two-phase modulation method is defined as "fsw2", the frequency of the second carrier wave with respect to the second control signals based on the three-phase modulation method is defined as "fsw3", and a frequency of the AC power source is defined as "fin", the carrier wave generation circuit generates the first carrier wave and the second carrier wave whose frequency fsw2 and frequency fsw3 have a relationship represented by "$fsw2=2\times fsw3\pm 3\times fin$".

11. The power conversion device as set forth in claim 7, wherein, when the frequency of the second carrier wave with respect to the second control signals based on the two-phase modulation method is defined as "fsw2", the frequency of the first carrier wave with respect to the first control signals based on the three-phase modulation method is defined as "fsw3", and a frequency of the AC power supplied to the load is defined as "fm", the carrier wave generation circuit generates the first carrier wave and the second carrier wave whose frequency fsw2 and frequency fsw3 have a relationship represented by "fsw2=2×fsw3±3×fm".

12. The power conversion device as set forth in claim 8, wherein, when the frequency of the second carrier wave with respect to the second control signals based on the two-phase modulation method is defined as "fsw2", the frequency of the first carrier wave with respect to the first control signals based on the three-phase modulation method is defined as "fsw3", and a frequency of the AC power supplied to the load is defined as "fm", the carrier wave generation circuit generates the first carrier wave and the second carrier wave whose frequency fsw2 and frequency fsw3 have a relationship represented by "fsw2=2×fsw3±3×fm".

13. The power conversion device as set forth in claim 1, wherein the converter control circuit includes a first reactive current calculator that, when a first current effective value that is an effective value of the current on the side of the inverter is larger than a second current effective value that is an effective value of the current on the side of the converter, generates a first reactive-current command value corresponding to a difference between the first current effective value and the second current effective value, so that the converter control circuit generates the first control signals that cause a reactive current in the current on the side of the converter to increase, on a basis of the first reactive-current command value.

14. The power conversion device as set forth in claim 1, wherein the inverter control circuit includes a second reactive current calculator that, when a first current effective value that is an effective value of the current on the side of the inverter is smaller than a second current effective value that is an effective value of the current on the side of the converter, generates a second reactive-current command value corresponding to a difference between the first current effective value and the second current effective value, so that the inverter control circuit generates the second control signals that cause a reactive current in the current on the side of the inverter to increase, on a basis of the second reactive-current command value.

15. The power conversion device as set forth in claim 1, wherein the converter control circuit includes a first reactive current calculator that, when a first current effective value that is an effective value of the current on the side of the inverter is larger than a second current effective value that is an effective value of the current on the side of the converter, generates a first reactive-current command value corresponding to a difference between the first current effective value and the second current effective value, so that the converter control circuit generates the first control signals that cause a reactive current in the current on the side of the converter to increase, on a basis of the first reactive-current command value; and wherein the inverter control circuit includes a second reactive current calculator that, when the first current effective value that is the effective value of the current on the side of the inverter is smaller than the second current effective value that is the effective value of the current on the side of the converter, generates a second reactive-current command value corresponding to a difference between the first current effective value and the second current effective value, so that the inverter control circuit generates the second control signals that cause a reactive current in the current on the side of the inverter to increase, on a basis of the second reactive-current command value.

16. The power conversion device as set forth in claim 1, further comprising:

another converter that converts the first AC power to other DC power;

another inverter that converts said other DC power outputted from said another converter to AC power, and that operates together with the inverter to supply the second AC power to the load; and another capacitor that is connected between another high-potential side line and another low-potential side line through which said other DC power is transferred;

wherein the high-potential side line is connected to said another high-potential side line;

wherein the low-potential side line is connected to said another low-potential side line; and wherein the control circuit outputs the first control signals to the converter and said another converter, and outputs the second control signals to the inverter and said another inverter.

17. The power conversion device as set forth in claim 2, wherein the converter control circuit generates the first control signals that are based on a two-phase modulation method, and wherein the inverter control circuit generates the second control signals that are based on a three-phase modulation method.

18. The power conversion device as set forth in claim 3, wherein the converter control circuit generates the first control signals that are based on a two-phase modulation method, and wherein the inverter control circuit generates the second control signals that are based on a three-phase modulation method.

19. The power conversion device as set forth in claim 2, wherein the converter control circuit generates the first control signals that are based on a three-phase modulation method, and wherein the inverter control circuit generates the second control signals that are based on a two-phase modulation method.

20. The power conversion device as set forth in claim 3, wherein the converter control circuit generates the first control signals that are based on a three-phase modulation method, and wherein the inverter control circuit generates the second control signals that are based on a two-phase modulation method.

* * * * *